US011774631B2

United States Patent
Abadie et al.

(10) Patent No.: US 11,774,631 B2
(45) Date of Patent: Oct. 3, 2023

(54) GEOLOGIC FORMATION NEUTRON POROSITY SYSTEM

(71) Applicant: Schlumberger Technology Corporation, Sugar Land, TX (US)

(72) Inventors: Joan Abadie, Montpellier (FR); Mohammad Taghi Salehi, Montpellier (FR); Koji Ito, Sugar Land, TX (US); John Rasmus, Richmond, TX (US); Xiao Bo Hong, Sugar Land, TX (US)

(73) Assignee: Schlumberger Technology Corporaton, Sugar Land, TX (US)

( * ) Notice: Subject to any disclaimer, the term of this patent is extended or adjusted under 35 U.S.C. 154(b) by 349 days.

(21) Appl. No.: 17/250,041

(22) PCT Filed: May 10, 2019

(86) PCT No.: PCT/US2019/031675
§ 371 (c)(1),
(2) Date: Nov. 11, 2020

(87) PCT Pub. No.: WO2019/217787
PCT Pub. Date: Nov. 14, 2019

(65) Prior Publication Data
US 2023/0102131 A1  Mar. 30, 2023

Related U.S. Application Data

(60) Provisional application No. 62/670,166, filed on May 11, 2018.

(51) Int. Cl.
*G01V 5/10* (2006.01)

(52) U.S. Cl.
CPC ................... *G01V 5/107* (2013.01)

(58) Field of Classification Search
CPC .......... G01V 5/107; G01V 5/045; G01V 5/12; G01V 5/104
See application file for complete search history.

(56) References Cited

U.S. PATENT DOCUMENTS 5,377,105 A * 12/1994 Smith .................... G01V 5/104
73/152.59
5,668,369 A * 9/1997 Oraby .................... G01V 5/101
250/269.5

(Continued)

FOREIGN PATENT DOCUMENTS

WO    2012162404 A2    11/2012
WO    WO-2013066682 A1 *  5/2013 ............... G01V 5/08

OTHER PUBLICATIONS

Extended Search Report issued European Patent Application No. 19800638.9 dated Dec. 23, 2021, 9 pages.

(Continued)

*Primary Examiner* — David P Porta
*Assistant Examiner* — Fani Polyzos Boosalis
(74) *Attorney, Agent, or Firm* — Jeffrey D. Frantz

(57) ABSTRACT

A method can include receiving neutron data and density data for a borehole in a geologic formation; determining a migration length value for a layer of the geologic formation based at least in part on the neutron data; forward modeling at least the layer based at least in part on the migration length value and the density data; and outputting, based at least in part on the forward modeling, modeled neutron data for the layer.

20 Claims, 20 Drawing Sheets

(56) References Cited

U.S. PATENT DOCUMENTS

| | | | | |
|---|---|---|---|---|
| 6,167,348 | A * | 12/2000 | Cannon | G01V 5/104 |
| | | | | 702/9 |
| 6,427,124 | B1 * | 7/2002 | Dubinsky | E21B 43/12 |
| | | | | 702/9 |
| 10,451,769 | B2 | 10/2019 | Rasmus et al. | |
| 11,255,994 | B2 * | 2/2022 | Ito | G01V 11/00 |
| 2009/0045328 | A1 | 2/2009 | Fricke et al. | |
| 2010/0004867 | A1 | 1/2010 | Zhou et al. | |
| 2014/0088877 | A1 | 3/2014 | Ellis et al. | |
| 2016/0130916 | A1 | 5/2016 | Abadie et al. | |
| 2016/0349398 | A1 | 12/2016 | Zhou et al. | |
| 2017/0160425 | A1 | 6/2017 | Miles et al. | |

OTHER PUBLICATIONS

International Preliminary Report on Patentability of International Patent Application No. PCT/US2019/031675 dated Nov. 17, 2020, 6 pages.

International Search Report and Written Opinion dated Nov. 14, 2019 in International Application No. PCT/US2019/031675, 8 pages.

Griffiths et al., "Formation Evaluation in High Angle and Horizontal Wells—A New and Practical Workflow," Society of Petrophysicists and Well Log Analysts (SPWLA) 53rd Annual Logging Symposium, Jun. 16-20, 2012, 16 pages.

* cited by examiner

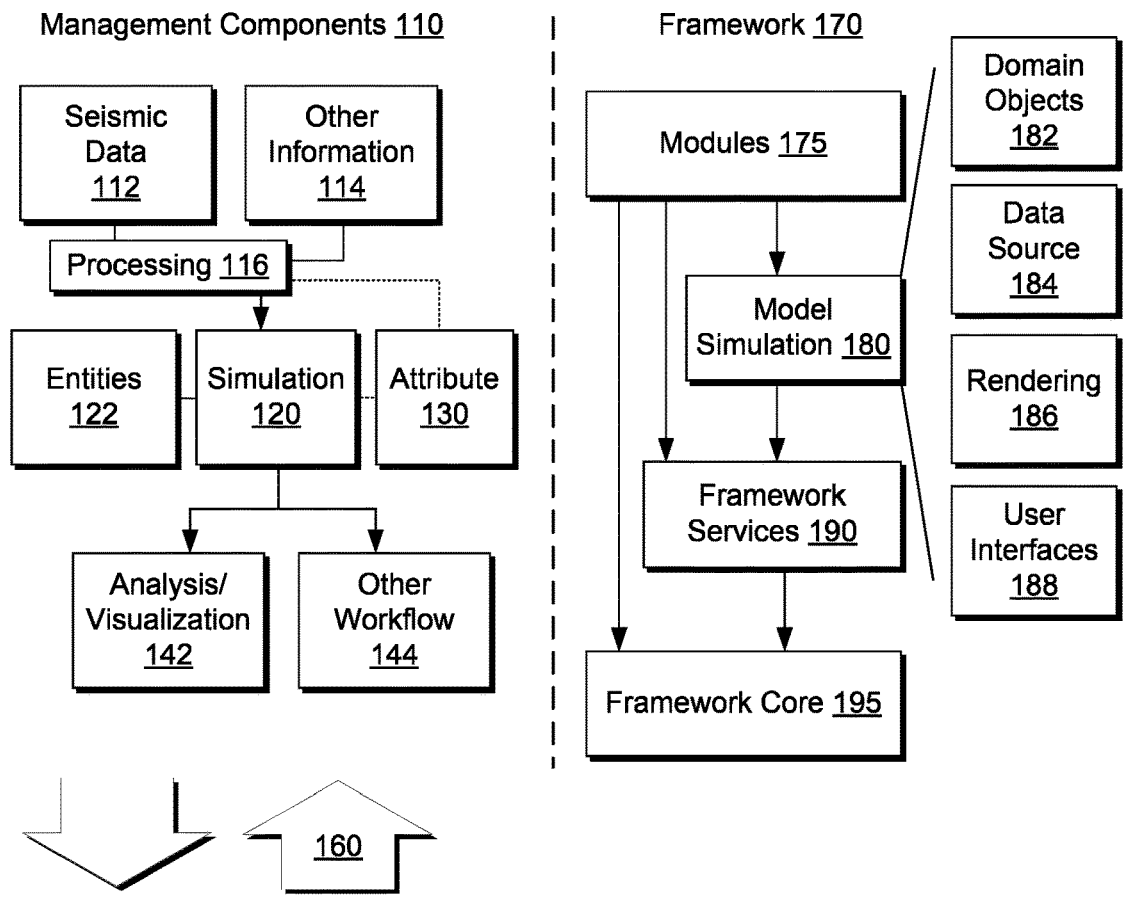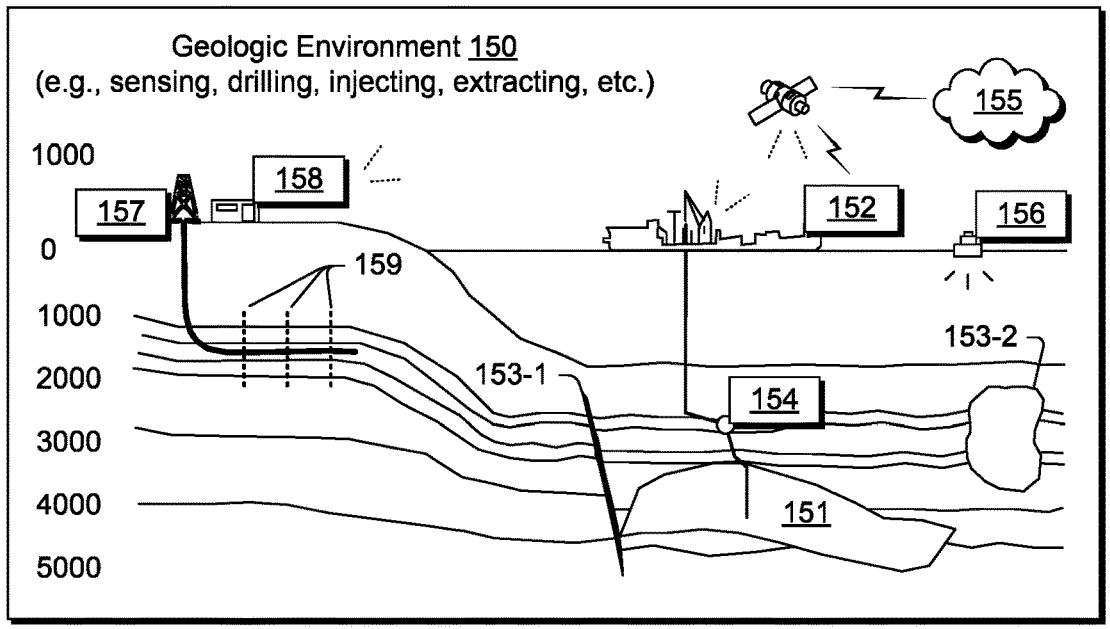
Fig. 1

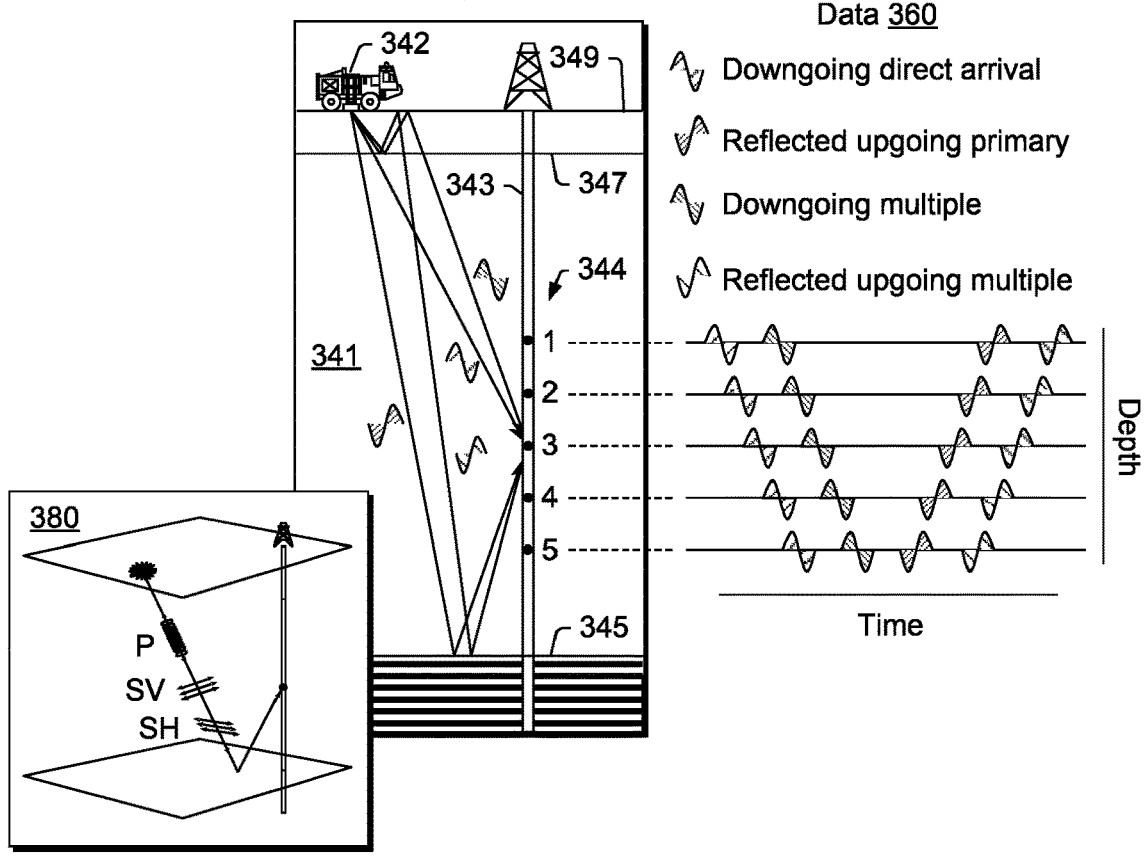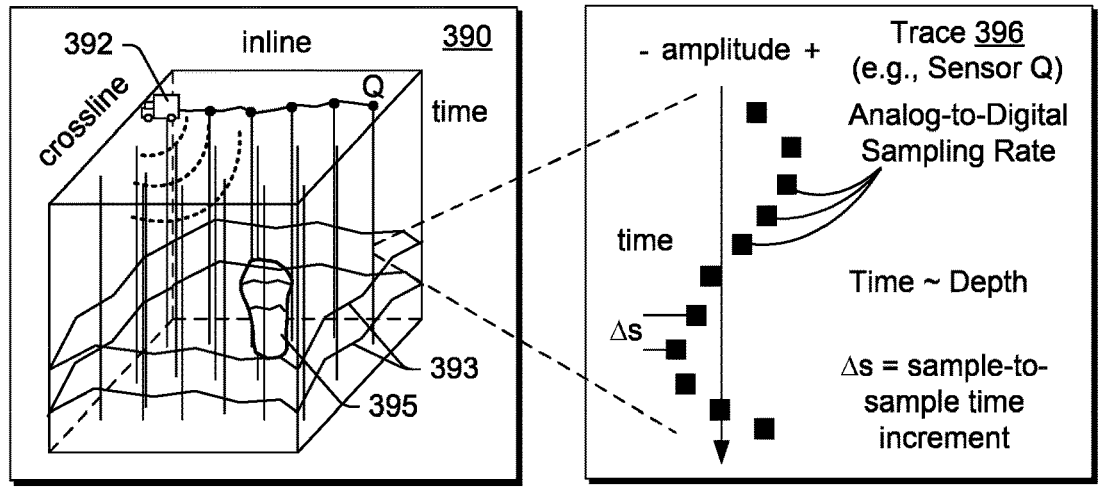
Fig. 3

1600

```cpp
//! @return the Lm porosity value from measured property (TNPH or BPHI) and layer density
double dichotomicSearch(const double targetNeutronPorosity, const double density,
std::function<>& tnphOrBphiFunct)
{
    //initialization
    const double acceptedEpsilon = 0.001;
    const unsigned int maxIteration = 50;
    double minLm = 12;
    double maxLm = 30;
    unsigned int iteration = 0;

//dichotomic search
    while (iteration < maxIteration)
    {
        //compute new candidate
        const double newLm = (minLm + maxLm)*.5;
        const double newTargetPorosity = tnphOrBphiFunct(newLm, density);
        //check if candidate fits our precision target
        if (abs(targetNeutronPorosity - newTargetPorosity) <= acceptedEpsilon)
                return newLm;
        //update search range
        if (newTargetPorosity > targetNeutronPorosity)
                maxLm = newLm;
        else
                minLm = newLm;
        ++iteration;
    } return NO_VALUE;

3DP for High Angle Well Evaluation
  Simplification of Neutron Porosity
  handling in global layer mode:
  - Property initialization
  - Forward modeling

1710

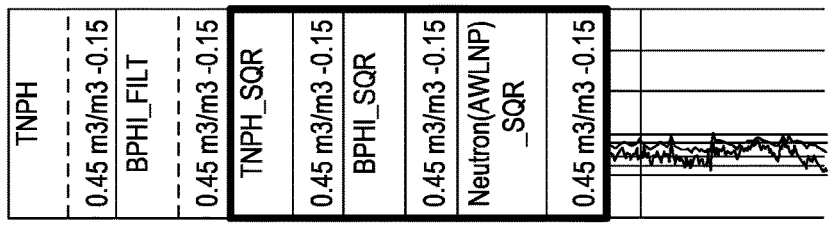

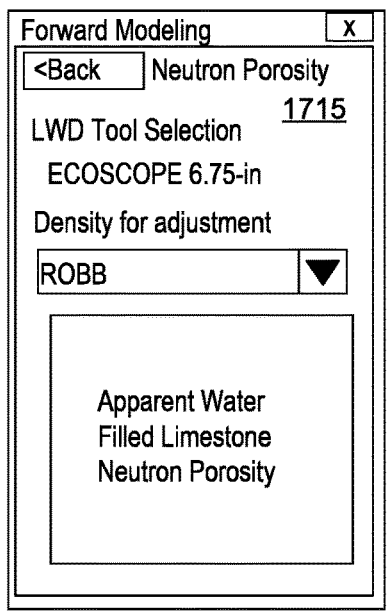

1750  *E.g., 3 to 1 Reduction*

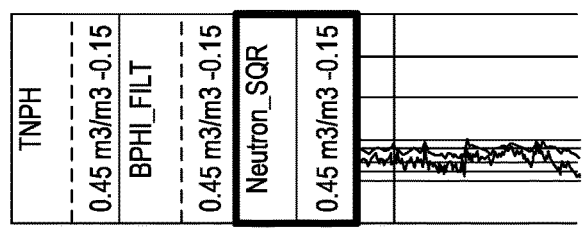

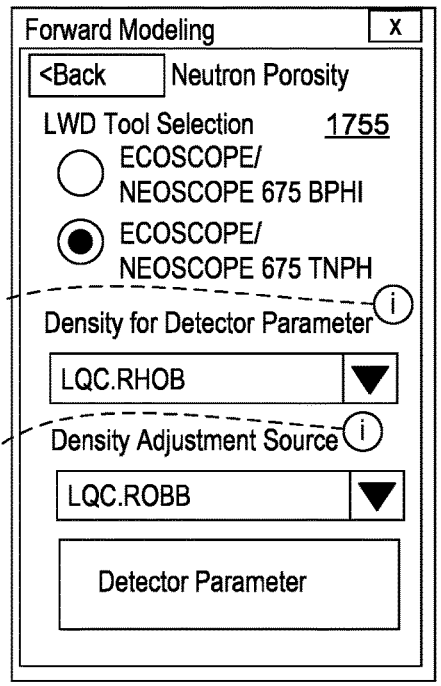

Supported variables:
Variable (with "Bulk Density" family) present in THL window that has "RHOB" in name, recommended to use measured RHOB BOTTOM density (ROBB) used for processing measured neutron porosity (BPHI_FILT). Recommended to use that variable for Forward Modeling.
Supported variables (from dataset "DVM_XYY_60B"): Variable present in THL window with bulk density family (except ROBB_shifted).

Fig. 17

GEOLOGIC FORMATION NEUTRON POROSITY SYSTEM

RELATED APPLICATIONS

This application claims priority to and the benefit of a US Provisional Application having Ser. No. 62/670,166, filed 11 May 2018, which is incorporated by reference herein.

BACKGROUND

A geologic formation is formed of material, which can include material as a matrix that can include one or more other materials such as, for example, fluids, solids, etc. A geologic formation can include pores within a material matrix that define a porosity that may be occupied by material (e.g., fluid, etc.). Porosity may be determined based on an effect of a formation on fast neutrons emitted by a source. For example, hydrogen can have an effect on a neutron that slows the neutron down and captures the neutron. As hydrogen may be present predominantly in pore fluid, a neutron porosity log responds predominantly to porosity; noting that other factors can include formation matrix factors, fluid factors, chemical factors, geometric factors, etc.

A log may be calibrated with assumptions as to a type of matrix (e.g., limestone, sandstone, dolomite, etc.) and type of pore fluid (e.g., pores filled with a known material such as fresh water). Porosity may be presented in units of porosity (vol/vol or p.u.) for a matrix chosen. Another approach presents neutron data in counts per second or American Petroleum Institute (API) units. A depth of investigation of a neutron measurement may be of the order of centimeters to tens of centimeters (e.g., 2 cm to 40 cm, etc.).

Neutron measurements may be based on phenomena such as thermal or epithermal neutron detection. Thermal neutrons tend to have about the same energy as surrounding matter (e.g., less than approximately 0.4 eV), while epithermal neutrons tend to have higher energy (e.g., between approximately 0.4 and approximately 10 eV). Precision tends to increase with higher count rates, which tend to occur at low porosity.

Neutron measurements can be utilized in interpretation. Interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.).

SUMMARY

A method can include receiving neutron data and density data for a borehole in a geologic formation; determining a migration length value for a layer of the geologic formation based at least in part on the neutron data; forward modeling at least the layer based at least in part on the migration length value and the density data; and outputting, based at least in part on the forward modeling, modeled neutron data for the layer. A system can include a processor; memory operatively coupled to the processor; and processor-executable instructions stored in the memory to instruct the system to: receive neutron data and density data for a borehole in a geologic formation; determine a migration length value for a layer of the geologic formation based at least in part on the neutron data; forward model at least the layer based at least in part on the migration length value and the density data; and output, based at least in part on the forward modeling, modeled neutron data for the layer. One or more computer-readable storage media can include computer-executable instructions executable to instruct a computing system to: receive neutron data and density data for a borehole in a geologic formation; determine a migration length value for a layer of the geologic formation based at least in part on the neutron data; forward model at least the layer based at least in part on the migration length value and the density data; and output, based at least in part on the forward modeling, modeled neutron data for the layer. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example system that includes various components for modeling a geologic environment and various equipment associated with the geologic environment;

FIG. 3 illustrates an example of a technique that may acquire data;

FIG. 16 illustrates an example of a method;

FIG. 17 illustrates examples of graphical user interfaces;

DETAILED DESCRIPTION

Figure 2:
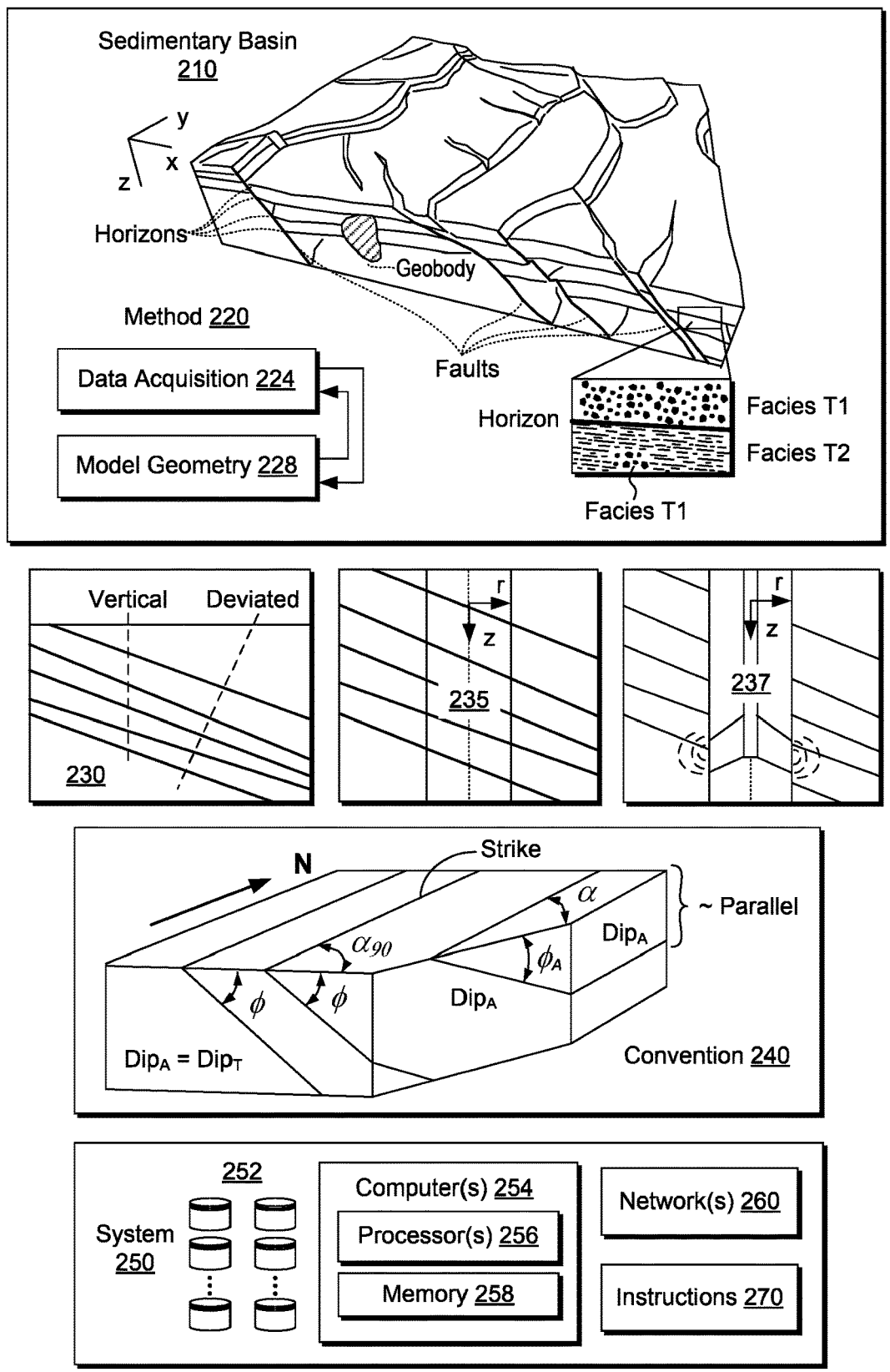
FIG. 2 illustrates an example of a sedimentary basin, an example of a method, an example of a formation, an example of a borehole, an example of a borehole tool, an example of a convention and an example of a system.

This description is not to be taken in a limiting sense, but rather is made merely for the purpose of describing the general principles of the implementations. The scope of the described implementations should be ascertained with reference to the issued claims.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT .NET framework (Redmond, Wash.), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE reservoir simulator (Schlumberger Limited, Houston Tex.), the INTERSECT reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL seismic to simulation software framework (Schlumberger Limited, Houston, Tex.). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN framework environment (Schlumberger Limited, Houston, Tex.) allows for integration of add-ons (or plug-ins) into a PETREL framework workflow. The OCEAN framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may be implemented within or in a manner operatively coupled to the DELFI cognitive exploration and production (E&P) environment (Schlumberger Limited, Houston, Tex.), which is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), a reservoir simulation framework (INTERSECT, Schlumberger Limited, Houston, Tex.), a surface facilities framework (e.g., PIPESIM, Schlumberger Limited, Houston, Tex.), a stimulation framework (MANGROVE framework, Schlumberger Limited, Houston, Tex.). As an example, one or more methods may be implemented at least in part via a framework (e.g., a computational framework) and/or an environment (e.g., a computational environment).

FIG. 1 also shows an example of a framework 170 that includes a model simulation layer 180 along with a framework services layer 190, a framework core layer 195 and a modules layer 175. The framework 170 may include the OCEAN framework where the model simulation layer 180 is the PETREL model-centric software package that hosts OCEAN framework applications. In an example embodiment, the PETREL software may be considered a data-driven application. The PETREL software can include a framework for model building and visualization.

As an example, seismic data may be processed using a framework such as the OMEGA framework (Schlumberger Limited, Houston, Tex.). The OMEGA framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA framework.

A framework for processing data may include features for 2D line and 3D seismic surveys. Modules for processing seismic data may include features for prestack seismic interpretation (PSI), optionally pluggable into a framework such as the OCEAN framework. A workflow may be specified to include processing via one or more frameworks, plug-ins, add-ons, etc. A workflow may include quantitative interpretation, which may include performing pre- and poststack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework, the DELFI environment, etc. As an example, a workflow may include one or more worksteps that access a module such as a plug-in (e.g., external executable code, etc.).

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. One or more operations may be performed in an environment based at least in part on such characterization of a subsurface environment or environments (e.g., via acquired data, simulation, modeling, etc.).

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework marketed as the PETROMOD framework (Schlumberger Limited, Houston, Tex.) includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG framework (Schlumberger Limited, Houston, Tex.). The TECHLOG framework includes: core systems features such as BASE, C-Data-API, CoreDB, Real Time, TechData-Plus, TechStat, and Viewer; geology features such as Advanced Plotting, Field Map, Ipsom, K.mod, and Wellbore Imaging (Wbi); geomechanics features such as Completion Geomechanics, Pore Pressure Prediction, and Wellbore Stability; geophysics features such as Acoustics and Geophysics; petrophysics features such as 3D Petrophysics (3DP), Acoustics, Nuclear Magnetic Resonance (NMR), Quanti., Quanti.Elan, TechCore and Thin Bed Analysis (TBA); production features such as Cased Hole, Production Logging, and Wellbore Integrity; reservoir engineering features such as Fluid Contact, Formation Pressure, Saturation-Height Modeling (SHM), and TechCore; and shale features such as Unconventionals and Quanti.Elan.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles ϕ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., ϕ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with ϕ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Data-based interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specify one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that can characterize anisotropy of media (e.g., seismic anisotropy, etc.), consider the Thomsen parameters $\varepsilon$, $\delta$ and $\gamma$. The Thomsen parameter $\delta$ can describe offset effects (e.g., short offset). As to the Thomsen parameter $\varepsilon$, it can describe offset effects (e.g., a long offset) and can relate to a difference between vertical and horizontal compressional waves (e.g., P or P-wave or quasi compressional wave qP or qP-wave). As to the Thomsen parameter $\gamma$, it can describe a shear wave effect. For example, consider an effect as to a horizontal shear wave with horizontal polarization to a vertical shear wave.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

Figure 4:
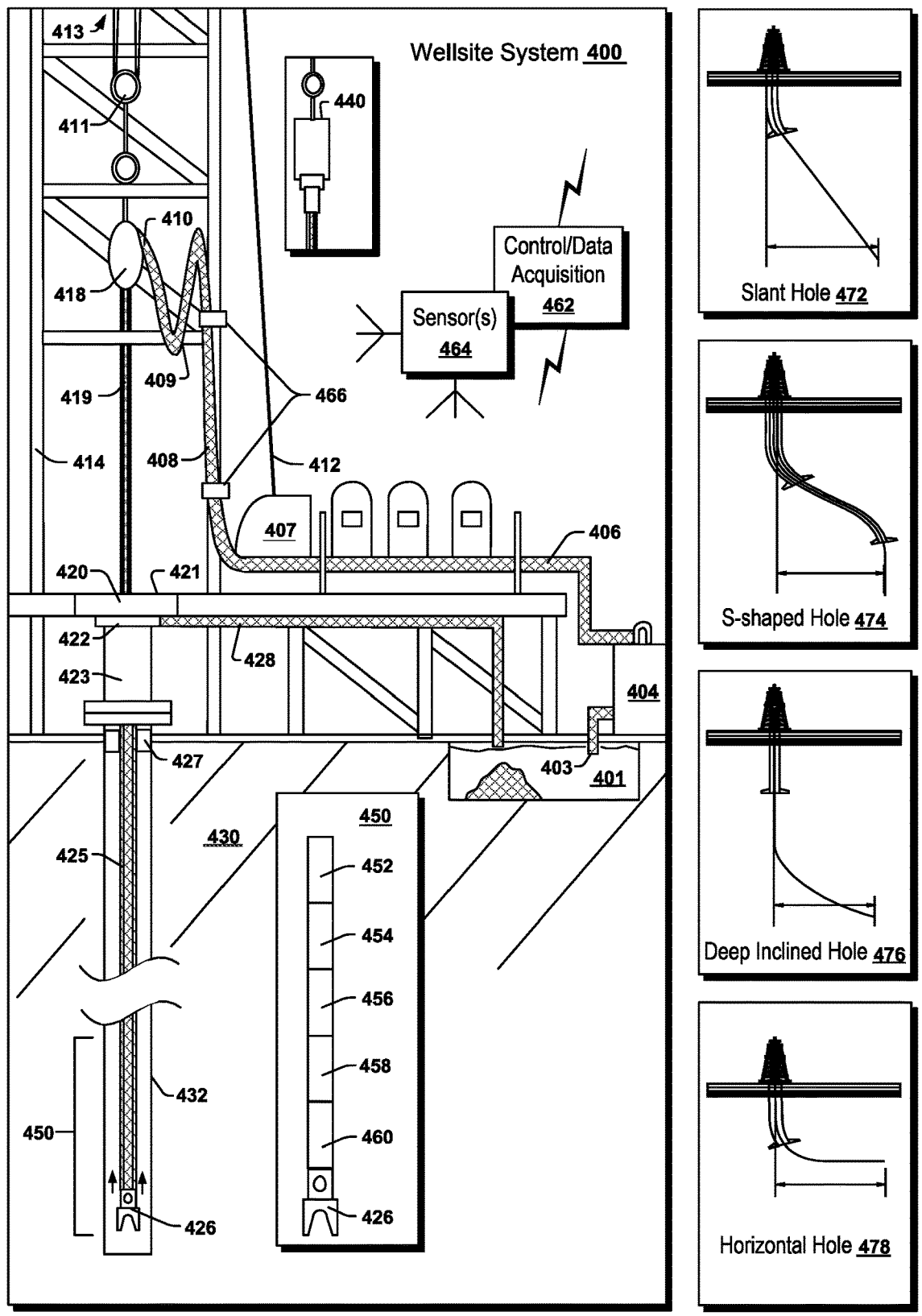
FIG. 4 illustrates examples of equipment including examples of downhole tools and examples of bores.

FIG. 4 shows an example of a wellsite system 400 (e.g., at a wellsite that may be onshore or offshore). As shown, the wellsite system 400 can include a mud tank 401 for holding mud and other material (e.g., where mud can be a drilling fluid), a suction line 403 that serves as an inlet to a mud pump 404 for pumping mud from the mud tank 401 such that mud flows to a vibrating hose 406, a drawworks 407 for winching drill line or drill lines 412, a standpipe 408 that receives mud from the vibrating hose 406, a kelly hose 409 that receives mud from the standpipe 408, a gooseneck or goosenecks 410, a traveling block 411, a crown block 413 for carrying the traveling block 411 via the drill line or drill lines 412, a derrick 414, a kelly 418 or a top drive 440, a kelly drive bushing 419, a rotary table 420, a drill floor 421, a bell nipple 422, one or more blowout preventors (BOPs) 423, a drillstring 425, a drill bit 426, a casing head 427 and a flow pipe 428 that carries mud and other material to, for example, the mud tank 401.

In the example system of FIG. 4, a borehole 432 is formed in subsurface formations 430 by rotary drilling; noting that various example embodiments may also use directional drilling.

As shown in the example of FIG. 4, the drillstring 425 is suspended within the borehole 432 and has a drillstring assembly 450 that includes the drill bit 426 at its lower end. As an example, the drillstring assembly 450 may be a bottom hole assembly (BHA).

The wellsite system 400 can provide for operation of the drillstring 425 and other operations. As shown, the wellsite system 400 includes the platform 411 and the derrick 414 positioned over the borehole 432. As mentioned, the wellsite system 400 can include the rotary table 420 where the drillstring 425 pass through an opening in the rotary table 420.

As shown in the example of FIG. 4, the wellsite system 400 can include the kelly 418 and associated components, etc., or a top drive 440 and associated components. As to a kelly example, the kelly 418 may be a square or hexagonal metal/alloy bar with a hole drilled therein that serves as a mud flow path. The kelly 418 can be used to transmit rotary motion from the rotary table 420 via the kelly drive bushing 419 to the drillstring 425, while allowing the drillstring 425 to be lowered or raised during rotation. The kelly 418 can pass through the kelly drive bushing 419, which can be driven by the rotary table 420. As an example, the rotary table 420 can include a master bushing that operatively couples to the kelly drive bushing 419 such that rotation of the rotary table 420 can turn the kelly drive bushing 419 and hence the kelly 418. The kelly drive bushing 419 can include an inside profile matching an outside profile (e.g., square, hexagonal, etc.) of the kelly 418; however, with slightly larger dimensions so that the kelly 418 can freely move up and down inside the kelly drive bushing 419.

As to a top drive example, the top drive 440 can provide functions performed by a kelly and a rotary table. The top drive 440 can turn the drillstring 425. As an example, the top drive 440 can include one or more motors (e.g., electric and/or hydraulic) connected with appropriate gearing to a short section of pipe called a quill, that in turn may be screwed into a saver sub or the drillstring 425 itself. The top drive 440 can be suspended from the traveling block 411, so the rotary mechanism is free to travel up and down the derrick 414. As an example, a top drive 440 may allow for drilling to be performed with more joint stands than a kelly/rotary table approach.

In the example of FIG. 4, the mud tank 401 can hold mud, which can be one or more types of drilling fluids. As an example, a wellbore may be drilled to produce fluid, inject fluid or both (e.g., hydrocarbons, minerals, water, etc.).

In the example of FIG. 4, the drillstring 425 (e.g., including one or more downhole tools) may be composed of a series of pipes threadably connected together to form a long tube with the drill bit 426 at the lower end thereof. As the drillstring 425 is advanced into a wellbore for drilling, at some point in time prior to or coincident with drilling, the mud may be pumped by the pump 404 from the mud tank 401 (e.g., or other source) via the lines 406, 408 and 409 to a port of the kelly 418 or, for example, to a port of the top drive 440. The mud can then flow via a passage (e.g., or passages) in the drillstring 425 and out of ports located on the drill bit 426 (see, e.g., a directional arrow). As the mud exits the drillstring 425 via ports in the drill bit 426, it can then circulate upwardly through an annular region between an outer surface(s) of the drillstring 425 and surrounding wall(s) (e.g., open borehole, casing, etc.), as indicated by directional arrows. In such a manner, the mud lubricates the drill bit 426 and carries heat energy (e.g., frictional or other energy) and formation cuttings to the surface where the mud (e.g., and cuttings) may be returned to the mud tank 401, for example, for recirculation (e.g., with processing to remove cuttings, etc.).

The mud pumped by the pump 404 into the drillstring 425 may, after exiting the drillstring 425, form a mudcake that lines the wellbore which, among other functions, may reduce friction between the drillstring 425 and surrounding wall(s) (e.g., borehole, casing, etc.). A reduction in friction may facilitate advancing or retracting the drillstring 425. During a drilling operation, the entire drill string 425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 426 of the drill string 425 at a bottom of a wellbore, pumping of the mud commences to lubricate the drill bit 426 for purposes of drilling to enlarge the wellbore. As mentioned, the mud can be pumped by the pump 404 into a passage of the drillstring 425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 425) may be transmitted uphole to an uphole device, which may relay such information to other equipment for processing, control, etc.

As an example, telemetry equipment may operate via transmission of energy via the drillstring 425 itself. For example, consider a signal generator that imparts coded energy signals to the drillstring 425 and repeaters that may receive such energy and repeat it to further transmit the coded energy signals (e.g., information, etc.).

As an example, the drillstring 425 may be fitted with telemetry equipment 452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 4, an uphole control and/or data acquisition system 462 may include circuitry to sense pressure pulses generated by telemetry equipment 452 and, for example, communicate sensed pressure pulses or information derived therefrom for process, control, etc.

The assembly 450 of the illustrated example includes a logging-while-drilling (LWD) module 454, a measuring-while-drilling (MWD) module 456, an optional module 458, a roto-steerable system and motor 460, and the drill bit 426.

The LWD module 454 may be housed in a suitable type of drill collar and can contain one or a plurality of selected types of logging tools. It will also be understood that more than one LWD and/or MWD module can be employed, for example, as represented at by the module 456 of the drillstring assembly 450. Where the position of an LWD module is mentioned, as an example, it may refer to a module at the position of the LWD module 454, the module 456, etc. An LWD module can include capabilities for measuring, processing, and storing information, as well as for communicating with the surface equipment. In the illustrated example, the LWD module 454 may include a seismic measuring device.

The MWD module 456 may be housed in a suitable type of drill collar and can contain one or more devices for measuring characteristics of the drillstring 425 and the drill bit 426. As an example, the MWD tool 456 may include equipment for generating electrical power, for example, to power various components of the drillstring 425. As an example, the MWD tool 456 may include the telemetry equipment 452, for example, where the turbine impeller can generate power by flow of the mud; it being understood that other power and/or battery systems may be employed for purposes of powering various components. As an example, the MWD module 456 may include one or more of the following types of measuring devices: a weight-on-bit measuring device, a torque measuring device, a vibration measuring device, a shock measuring device, a stick slip measuring device, a direction measuring device, and an inclination measuring device.

FIG. 4 also shows some examples of types of holes that may be drilled. For example, consider a slant hole 472, an S-shaped hole 474, a deep inclined hole 476 and a horizontal hole 478.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 4, the wellsite system 400 can include one or more sensors 464 that are operatively coupled to the control and/or data acquisition system 462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 400. As an example, a sensor or sensor may be at an offset wellsite where the wellsite system 400 and the offset wellsite are in a common field (e.g., oil and/or gas field).

As an example, one or more of the sensors 464 can be provided for tracking pipe, tracking movement of at least a portion of a drillstring, etc.

As an example, the system 400 can include one or more sensors 466 that can sense and/or transmit signals to a fluid conduit such as a drilling fluid conduit (e.g., a drilling mud conduit). For example, in the system 400, the one or more sensors 466 can be operatively coupled to portions of the standpipe 408 through which mud flows. As an example, a downhole tool can generate pulses that can travel through the mud and be sensed by one or more of the one or more sensors 466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 400 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the term can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 5:
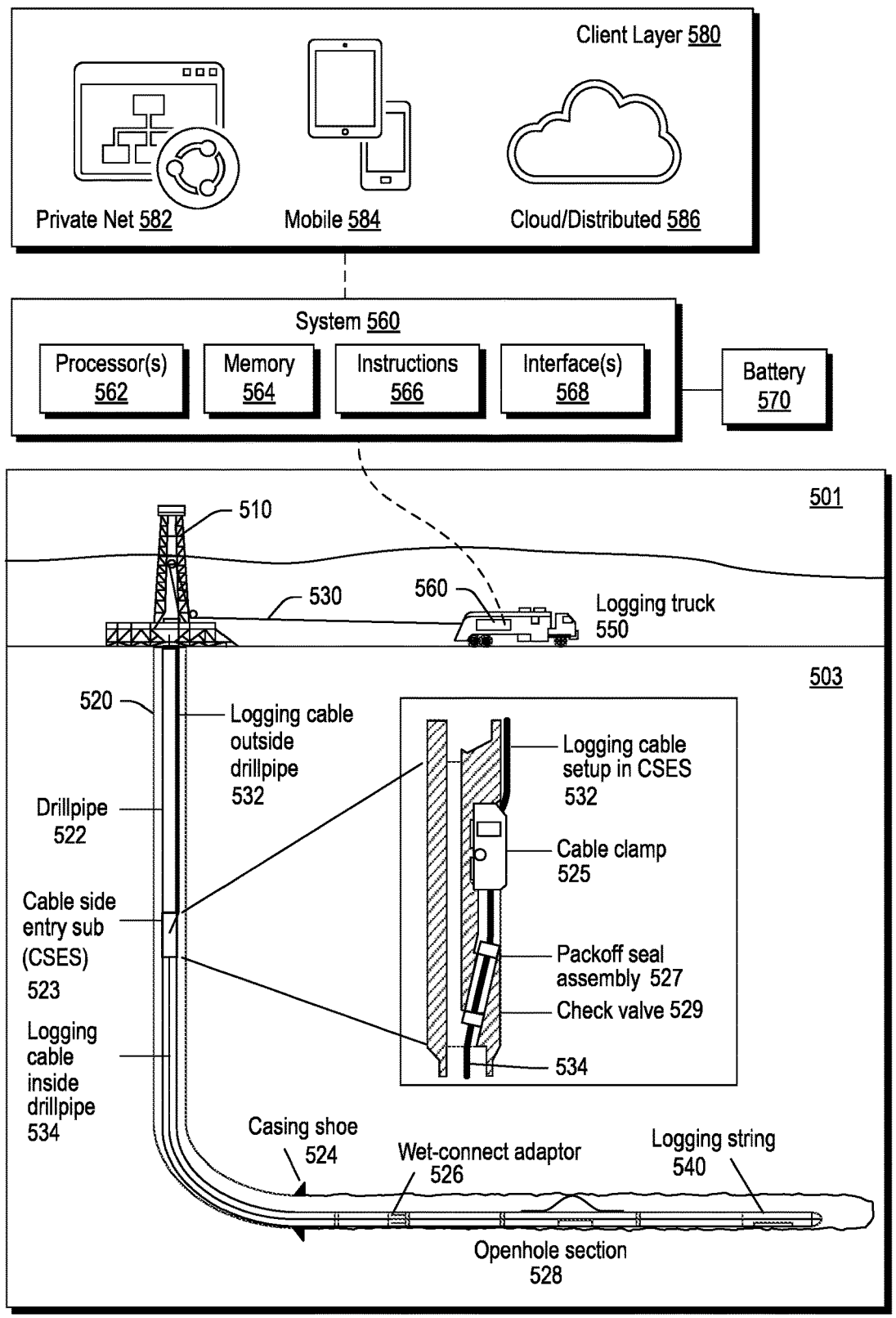
FIG. 5 illustrates examples of equipment including examples of downhole tools.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

FIGS. 1, 2, 3, 4 and 5 show various examples of equipment in various examples of environments. As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

Figure 6:
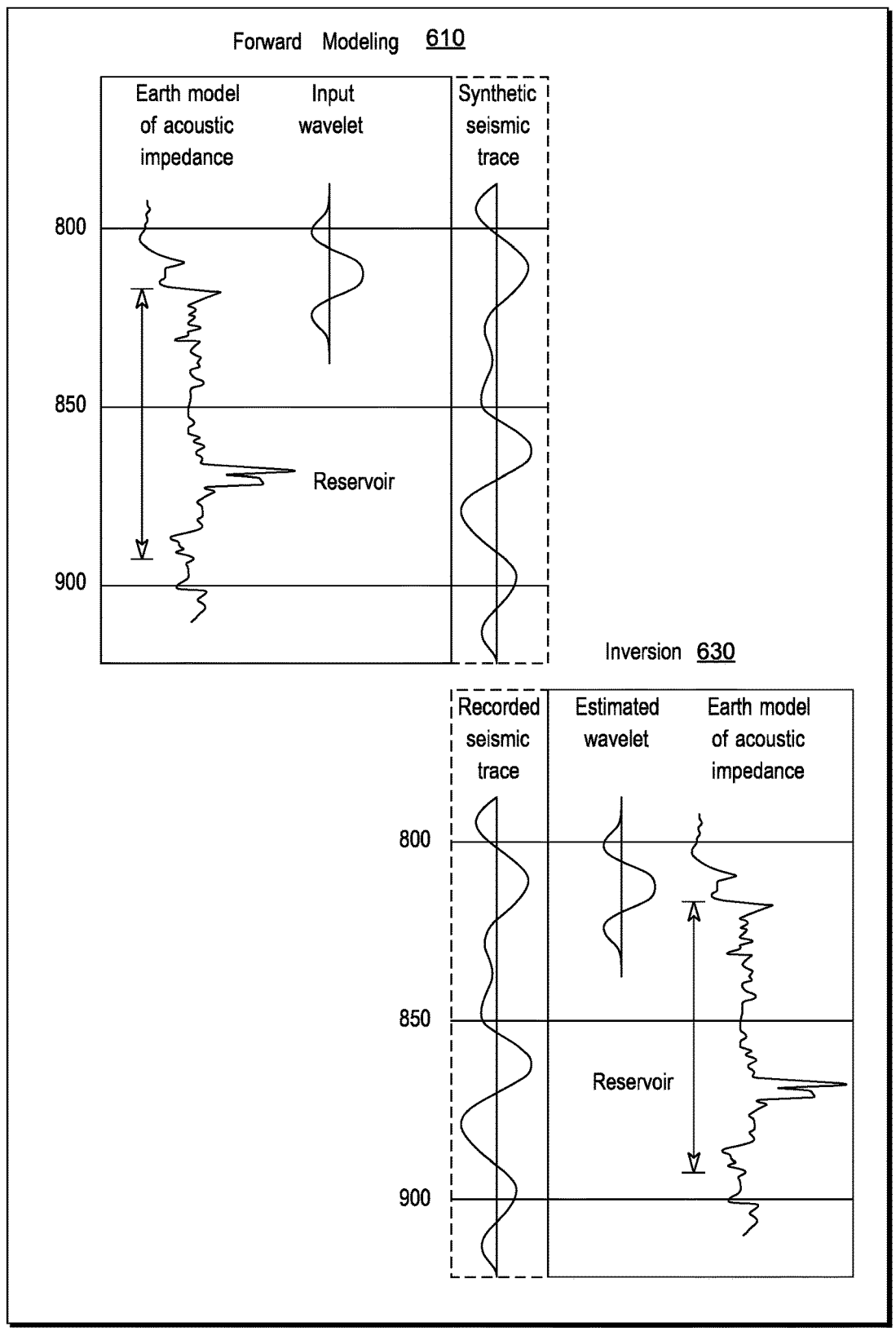
FIG. 6 illustrates an example of forward modeling and inversion as to seismic data and an Earth model of acoustic impedance.

FIG. 6 shows an example of forward modeling 610 and an example of inversion 630 (e.g., an inversion or inverting). As shown, the forward modeling 610 progresses from an earth model of acoustic impedance and an input wavelet to a synthetic seismic trace while the inversion 630 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Tex.) may be implemented to perform an inversion. As an example, a framework such as the Linearized Orthotropic Inversion framework (Schlumberger Limited, Houston, Tex.) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Figure 7:
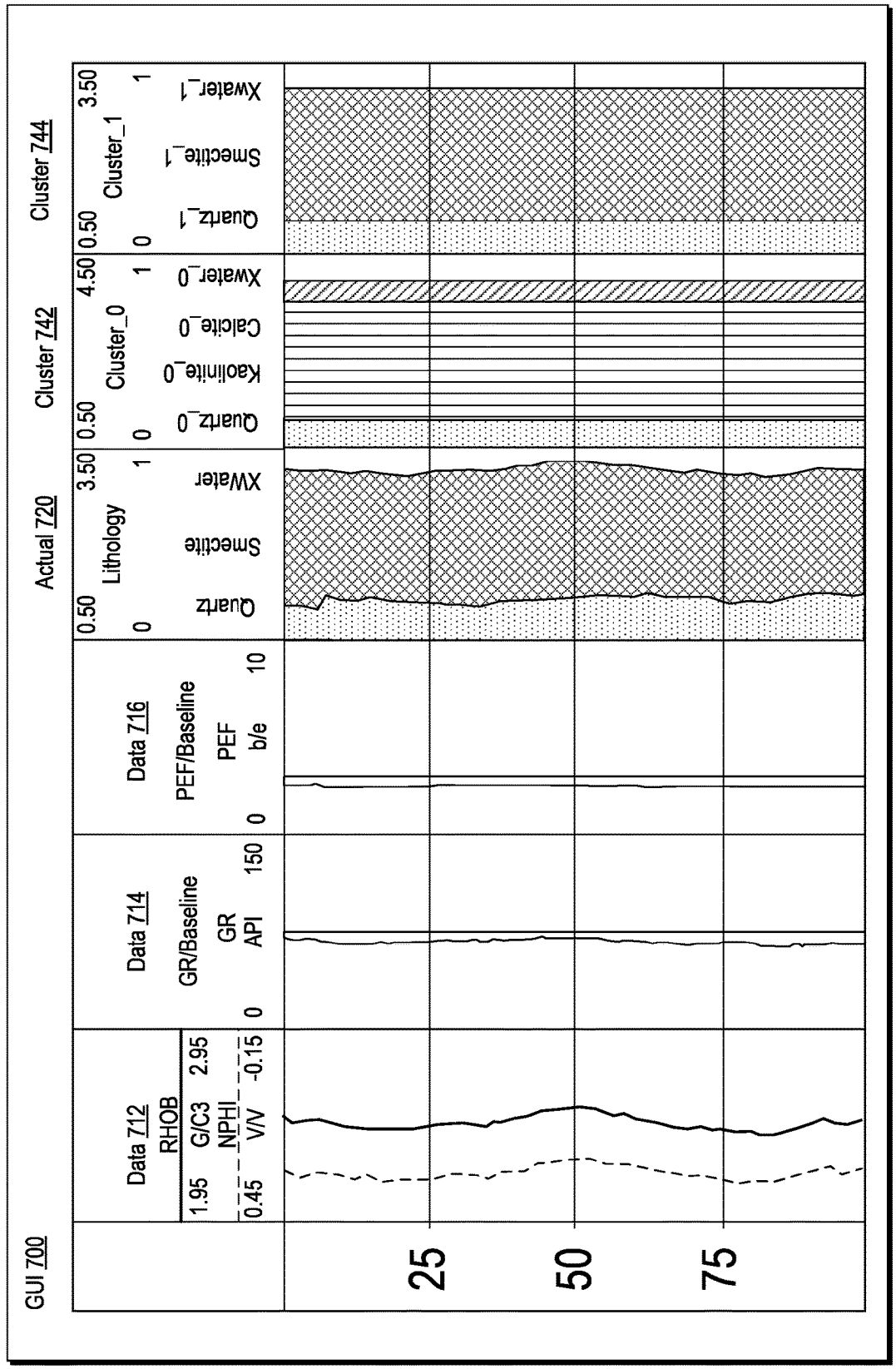
FIG. 7 illustrates an example graphical user interface that includes plots of data, lithologies and clusters.

FIG. 7 shows an example graphical user interface (GUI) 700 that includes example plots as to acquired data 712, 714 and 716, actual lithology 720 and computational framework lithology cluster data 742 and 744 that are based at least in part on at least a portion of one or more of the acquired data 712, 714 and 716. A process that goes from acquired data to computational framework lithology can be referred to as an inversion process. In such a process, acquired data include information that is responsive to energy interactions with material that makes up a subsurface environment (e.g., rock, fluid(s), etc.). Various types of acquired data can be generated via one or more downhole tools that receive one or more types of energy via one or more types of sensors where such one or more types of energy depend on one or more types of physical characteristics of material. A downhole tool can be a data acquisition tool that acquires data via one or more sensors where such data can be analyzed to determine one or more types of physical characteristics of material in a subsurface environment. A downhole tool can be a type of "camera" that exists for the purposes of generating an "image" or a "model" of a region or regions in a subsurface environment. As to the GUI 700, it may be rendered via execution of process-executable instructions that access data, which may include sensor data and/or computer generated data. Such a GUI 700 may be rendered to a display and include graphical controls that allow for interactions therewith via one or more input devices (e.g., mouse, voice, keystrokes, touchscreen, etc.).

Table 1, below, shows some examples of data, which may be referred to as "log" data that are associated with petrophysical and rock physics properties calculation and analysis.

TABLE 1

Some Examples of Log Data.

| Name | Uses |
| --- | --- |
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, σ, etc.) calculation, etc. |
| Neutron Porosity (BPHI or TNPH or NPHI) | Finding hydrocarbon bearing zone, porosity calculation, etc. |
| Sonic (DT) | Porosity calculation, wave velocity calculation, rock physics properties (AI, SI, σ, etc.) calculation, etc. |
| Photoelectric (PEF) | Mineral determination (for lithology interpretation) |

In Table 1, as to rock properties, AI is acoustic impedance, SI is shear impedance and σ is the Poisson ratio; and, as to spontaneous potential (SP), Rw is the formation water resistivity and Rwe is the formation water resistivity (without thermal effect).

Referring again to FIG. 7, the acquired data 712 include density (RHOB) data and neutron porosity (NPHI, etc.) data, the acquired data 714 include gamma ray (GR) data and the acquired data 716 include photoelectric (PEF) data. As indicated in Table 1, such data can be utilized for lithology interpretation. Where TNPH or NPHI are mentioned, individually, NPHI or TNPH, respectively, may be utilized or, for example, BPHI.

As to RHOB, it is representative of density of bulk material, including void space or other materials in a subject volume. In well logging, RHOB can be density of rock, including fluid-filled pore space, for example, as measured with a "Gamma-Gamma" type of logging device. Another characteristic term is referred to as electron density, for example, from a gamma-gamma logging technique that responds to electron density, which can be near bulk density for various formation types. Yet another characteristic term is referred to as litho-density, for example, a formation density as measured with a litho-density or gamma-bamma type logging tool. As an example, a litho-density parameter may be abbreviated as RHOB. Various tools include associated parameters, which may be specified according to various mnemonics. For example, an ECOSCOPE tool can include a RHOB parameter as a bulk density parameter.

In FIG. 7, the actual lithology 720 indicates the presence of quartz, smectite and water, in a manner that depends on a dimension such as depth, which may be total depth, measured depth, etc. In the example of FIG. 7, depth is shown in feet. In terms of the computational framework lithology cluster data 742 and 744, compositions of subsurface material are shown with respect to depth. Such data are generated to "reproduce" the actual composition of the generally "unknown" subsurface material. In the example of FIG. 7, the composition is "known", as indicated by the plot of the actual lithology 720, for purposes of comparison to the computational framework lithology cluster data 742 and 744.

As an example, a method can include acquiring data using one or more downhole tools in a subsurface environment and inverting to generate one or more clusters that aim to represent the actual lithology of at least a portion of the subsurface environment. In the example of FIG. 7, the computational framework lithology cluster data 744 is a closer match to the actual lithology 720 than the computational framework lithology cluster data 742. In such an example, the cluster data 742 "explains" the acquired data in that it estimates what the composition of the subsurface environment may be for the one or more downhole tools to acquire data (see, e.g., acquired data 712, 714 and/or 716).

As explained above, in petrophysics, it is possible to characterize lithology based on one or more logs using an inversion approach. For example, consider a method that includes defining zones of a borehole (e.g., a well), selecting mineralogical components and fluids for each of the defined zones, and tuning the physical parameters (e.g., endpoints) of the components as appropriate.

In an interpretation workflow, a petrophysicist may iterate via selecting and tuning until a zone model fits the data and/or achieves an acceptable match with core data. For example, consider that tuning of one or more endpoints may be appropriate for one or more shaly components. In a framework such as the TECHLOG framework, technology such as the QUANTI.ELAN (Schlumberger Limited, Houston, Tex.) may be utilized, which implements an ELAN solver. Such technology may be utilized in an effort to validate mineralogy of a layer by examining reconstruction error of one or more models. As an example, mineral selection may be performed via examination of a chart, for example, consider a cross-plot of two logs. In such an approach, in a bulk density-neutron porosity cross-plot an expert may identify the presence of gas, limestone or any unusual mineral. As an example, such a process may be automated, for example, on a geological stratum or an electrofacies.

As to the QUANTI.ELAN technology (see, e.g., TECHLOG framework), it can implement a multicomponent inversion model incorporating the ELAN solver, which allows for reapplication of models to various data, an ability to combine outputs from several models to improve accuracy of results, transference of models to other projects, use of curves, use of constants for end-point, etc.

Technology such as the QUANTI.ELAN technology can allow for initialization of various parameters (e.g., temperature, pressure, salinity, and porosity dependent parameters), utilization of various resistivity models (e.g., Archie, Dual Water, Juhasz, Waxman-Smits, Simandoux, Indonesia, etc.), utilization of various sonic models (e.g., Wyllie, Raymer-Hunt-Gardner, Raiga-Clemenceau, field, velocity equation, etc.), utilization of neutron equations (e.g., linear and non-linear response functions for wireline and/or LWD neutron tools), support of geochemical logs (e.g., in a form of dry weights, etc.), embedded post-processing (e.g., for computation of formation properties such as porosity, water saturation (Sw), permeability, etc.), definition of models, etc.

As to model definition, a model may be defined using single mineral sets per zone or multiple mineral sets per zone, for example, with sets switching automatically according to a partitioning curve that may change as log facies change. As an example, a framework may provide for interactive parameter management (e.g., for wet clay, etc.). As an example, model-based solutions may be constrained, for example, consider one or more constraints based on information known a priori (e.g., consider X-ray diffraction (XRD) data, cation exchange capacity (CEC) data, etc.). As an example, single and multicomponent volume constraints may be utilized.

As to output from a framework, array-histograms may be generated and rendered to a display, for example, to help to clarify data relationships by plotting components against input log data or log data residuals. As an example, a framework may provide for output of Juhasz plots, m*plots, result curves (e.g., mineral volumes, Sw, and φ), calculated uncertainties relating to choice of model components and parameters, sensitivity analysis with a plot such as a tornado plot to investigate contribution of different parameters in a model, etc.

Figure 8:
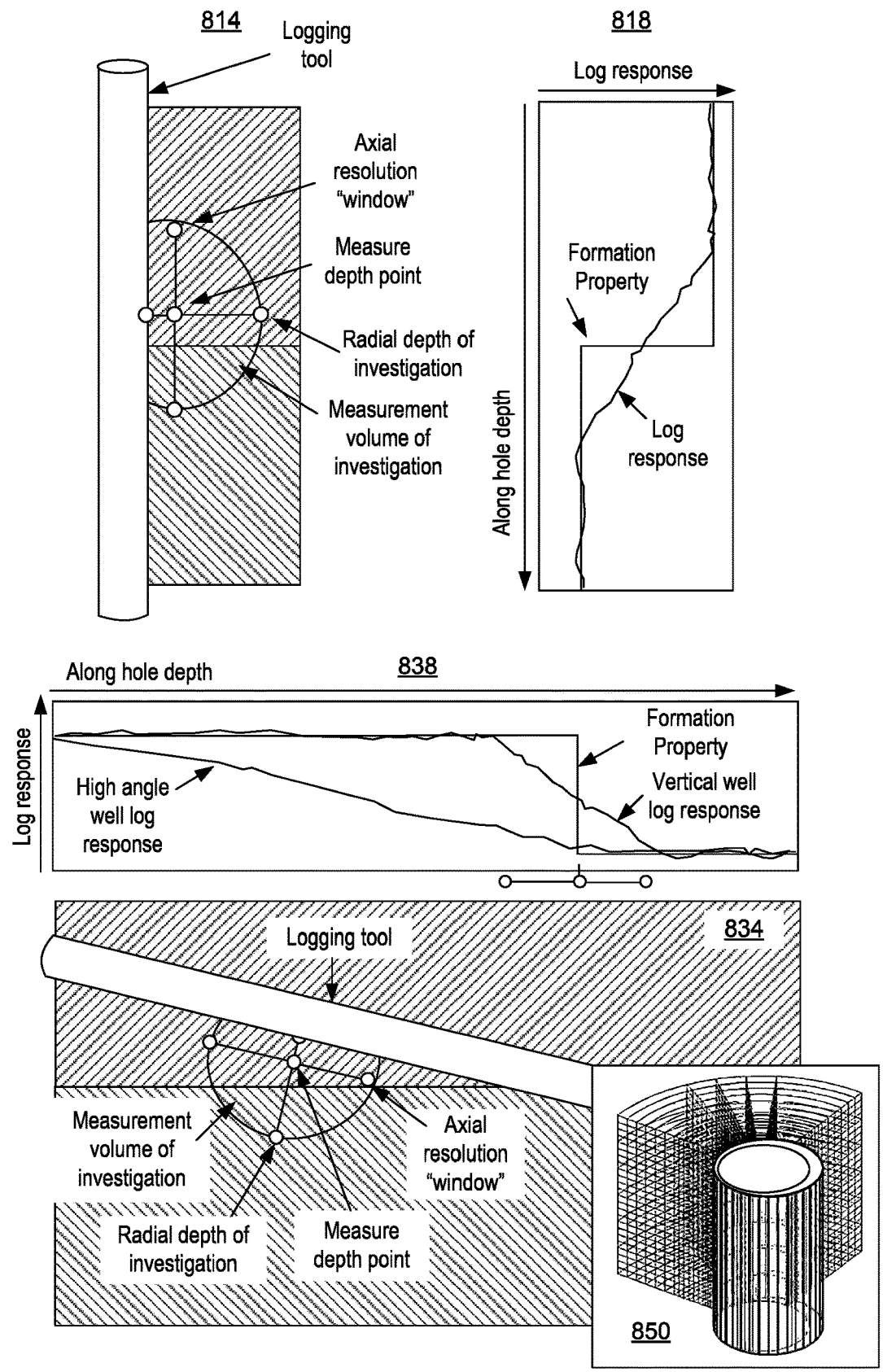
FIG. 8 illustrates various geometries of a borehole along with examples of data and an example of a grid cell model.

FIG. 8 shows example graphics 814 and 834 and example plots 818 and 838 for arrangements of tools in boreholes in geologic formations along with a graphical representation of a numeric model 850 of a downhole environment with a tool in a borehole. As shown, depending on factors such as dip, borehole trajectory, etc., data can differ. In particular, data acquired in high angle boreholes can exhibit "smearing" (e.g., consider high angle horizontal wells, HaHz). For example, a volumetric measurement acquired at a low incidence angle to a formation boundary will detect the proximate layer before the wellbore crosses the boundary, due to the depth of investigation of the measurement, which can cause an apparent smearing of the measured depth log as compared to a vertical well boundary crossing. If the radial depth of investigation is less than the axial resolution window, plotting the log versus true stratigraphic thickness index will show a sharper transition at the boundary. This is because the measurement is averaged across the smaller radial depth of investigation length rather than the longer axial resolution window.

As shown in the graphic 814, the logging tool has a longitudinal axis that is aligned perpendicular to a boundary between formation layers. As such, the plot 818 of the log response versus depth tends to provide an acceptable approximately to the actual formation property transition at the boundary. As shown in the graphic 814, the measurement volume of investigate enters the deeper layer before the measure depth point, which is used to construct the plot 818. Hence, the tool begins to measure the deeper formation before the measure depth point reaches the boundary, which causes the log response to shift before reaching the boundary. As shown in the graphic 834, where the longitudinal axis of the logging tool is no longer perpendicular to the boundary, referred to as a "high angle" as it is with respect to drilling angle, the effect of the deeper layer is seen at even shallower depths. The plot 838 shows both the high angle well log response and the vertical well log response with respect to the sharp transition at the boundary to illustrate how smearing occurs and how it can make boundary determinations, with respect to depth, more challenging.

As to the illustrated sharp transition, it can be referred to as being "square". As an example, a method can include generating one or more "square logs" using one or more types of log responses (e.g., log measurements, etc.). A square log can be defined as a log in which the changes in readings with depth occur abruptly. A square log may be an approximation of a real log, in which a varying input log has been approximated by constant values and abrupt changes. A square log can include less data than a real log but can be useful for further processing, analysis, etc.

As an example, a method may utilize a model, which may be a forward model. Such a model can be a numeric model that includes a grid or a mesh of a subsurface environment, which may account for an offset between a tool longitudinal axis and a borehole longitudinal axis. In such an example, the tool can be eccentric to the borehole, as shown in the graphical representation of the model 850. Such a model may be a finite element, finite difference or other type of model. As shown, at least a portion of a region outside the borehole can be discretized where physics-based equations can be represented, for example, to account for energy emitted and energy received as well as properties of the region. As an example, a forward model may be utilized to predict a log response. As an example, a forward model may optionally be utilized in a loop, for example, where one or more parameters, values, etc., are varied and where forward model results are compared to actual log responses.

As an example, a method can include: acquiring logs in a HaHz well to identify locations where the well path intersects layer boundaries; if available and/or as desired, using image logs to calculate true and relative dips at each of the boundary crossings; constructing a structural model using the boundary locations and dips; if desired, adding boundaries that are located beneath the wellbore (e.g., uncrossed boundaries) to the model (e.g., spatial positions of one or more of such boundaries may be estimated from one or more offset well logs); populating each layer in the structural model with log property values (e.g., gamma ray, vertical resistivity, horizontal resistivity, etc.) where, for layers that are intersected by the wellbore, utilizing measured logs to provide initial estimates of property values and, for layers that are not crossed by the wellbore, entering initial property values (e.g., manually entered by a user); inserting lateral property boundaries into the model as appropriate, for example, when the same layer is crossed multiple times, variations in properties may be observed along the well path; computing forward model (FM) logs where the FM logs are a function of the structural model and layer properties; comparing the FM logs to the measured logs; adjusting details of the structural model and/or layer properties until there is acceptable agreement between the measured and FM logs; and utilizing the layer properties determined from the workflow for petrophysical evaluation (e.g., optionally rather than the measured logs).

In such a workflow, one or more graphical user interfaces may be implemented that render information to a display or displays, which may be touch screen or other types of displays. As an example, a user may utilize an input device such as a mouse, a stylus, a finger, etc., to make one or more adjustments in a process that aims to output layer properties based at least in part on measured information, as measured, for example, via one or more downhole tools (e.g., wireline, LWD, etc.).

Figure 9:
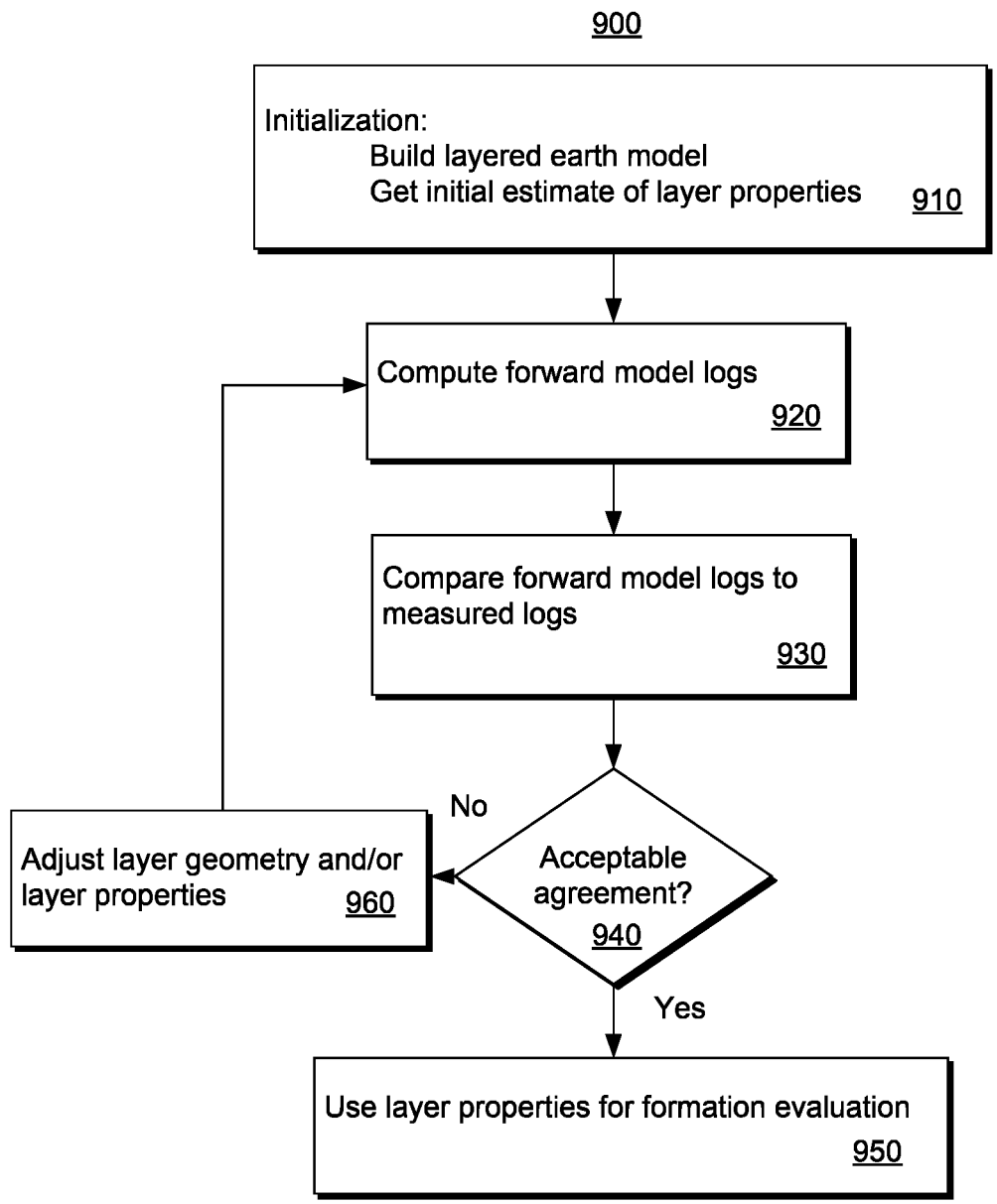
FIG. 9 illustrates an example of a method.

FIG. 9 shows an example of a method 900 that includes an initiation block 910, a computation block 920 for computing forward model logs, a comparison block 930 for comparing forward model logs to measured logs, a decision block 940 for deciding whether acceptable agreement exists (e.g., via one or more metrics, etc.), and an output block 950 for outputting layer properties for reservoir evaluation (e.g., one or more reservoir operations, etc.). As shown, where the decision block 940 decides that agreement is not acceptable, the method 900 can continue at an adjustment block 960 for adjusting one or more layer positions and/or adjusting one or more layer properties. As shown, the method 900 may then continue at the computation block 920, for example, in an iterative loop until the decision block 940 decides that agreement is acceptable. In such an example, one or more criteria may be utilized to determine whether agreement is acceptable. For example, consider an error criterion that depends on mismatch error between a forward model log and a measured log. As an example, a loop may include an iteration criterion, for example, where the loop terminates after a number of iterations where error is not progressively reduced (e.g., below a desired amount, etc.).

The foregoing method can be part of an interpretation workflow such as a multidimensional petrophysic interpretation workflow that determines position and properties of individual layers around a borehole (e.g., a well or wellbore, etc.). As explained, a user may start by modeling subsurface layer geometry to generate a structural model (see, e.g., the graphical representation of the model 850 of FIG. 8) and then populating the structural model with log property values (e.g., one or more of gamma ray, neutron porosity, density, etc.). As an example, logs recorded in the borehole can be first used to provide initial estimates of property values. Such logs may be or include, for example, LWD logs (e.g., acquired while drilling the borehole).

As mentioned, forward model (FM) logs can be computed and compared with measured logs where the structural model can be adjusted until there is acceptable agreement between the measured and FM logs (e.g., a "model, compare, update" workflow). Layer properties determined can be used for one or more purposes such as, petrophysical evaluation. Such layer properties may be utilized rather than the measured logs.

Figure 10:
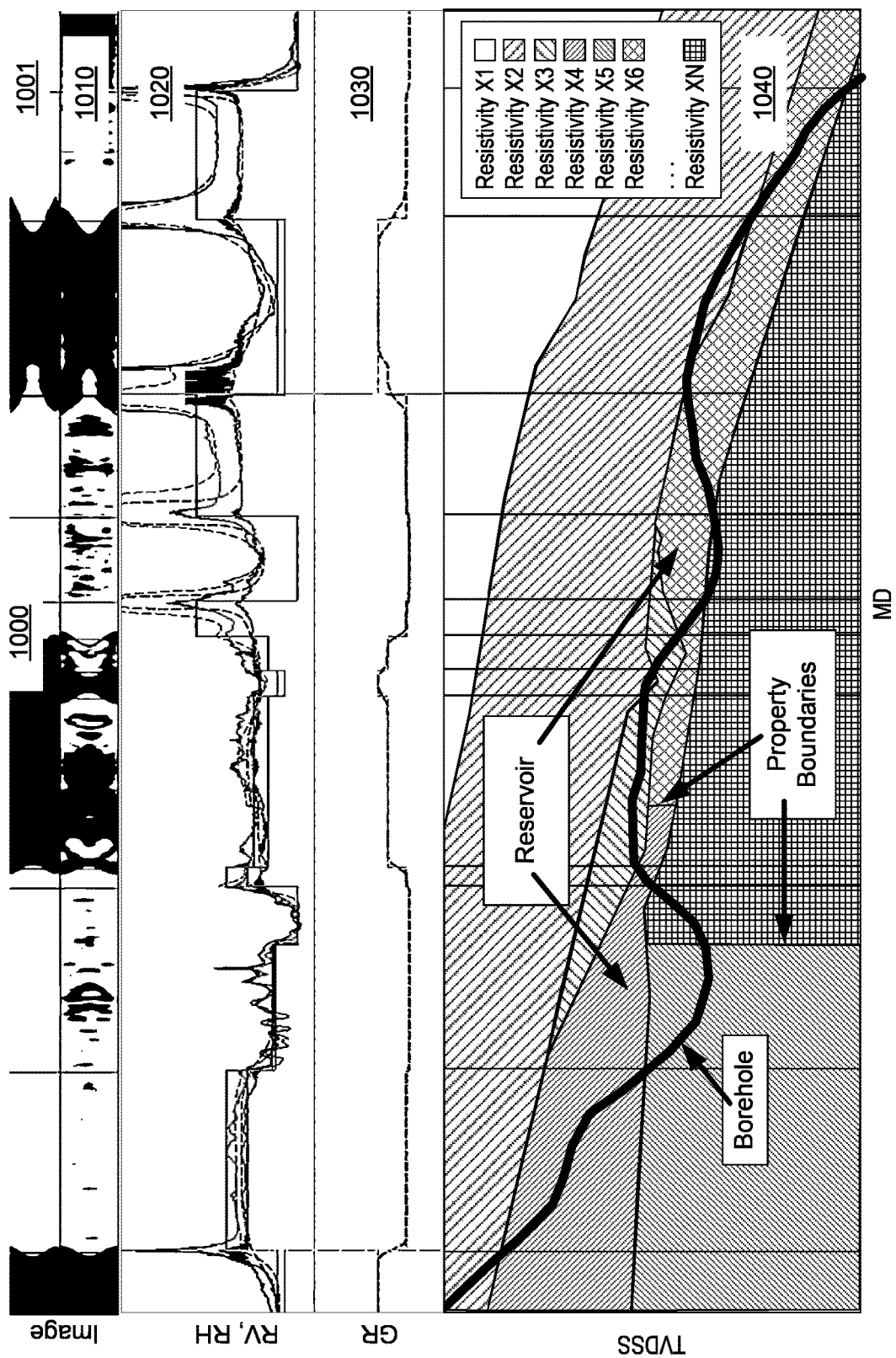
FIG. 10 illustrates an example of a graphical user interface, various types of data and an example of a model of a portion of a geologic environment.

FIG. 10 shows an example of a graphical user interface (GUI) 1000 that includes example plots 1001, 1010, 1020, 1030 and 1040 of a HaHz well interpretation interface after several iterations of the model-compare-update workflow. The plot 1001 is synthetic image data as generated from synthetic log responses via forward modeling, where the forward modeling achieves an acceptable match between the synthetic log responses and real log responses. The plot 1010 includes image data, the plot 1020 includes vertical resistivity (RV or Rv) and horizontal resistivity (RH or Rh) data and the plot 1030 includes GR data. The plot 1040 includes a borehole trajectory in a true vertical depth (TVD or TVDSS, e.g., as measured from mean sea level (MSL)) versus measured depth (MD) space, along with various resistivity regions with different values, where a reservoir and some property boundaries are demarcated.

The GUI 1000 indicates that the borehole can be characterized at least in part as being "high angle", for example, as smearing can be seen in various data as plotted by log response versus measured depth (MD). The image data of the plot 1010 indicate smearing as do the data of the RV and RH plot 1020 and the data of the GR plot 1030. In the plots 1020 and 1030, square logs are shown, for which corresponding vertical lines are illustrated in the plot 1040. In the GUI 1000, a logging tool graphical control may be navigated along the trajectory whereby an indicator or indicators can be provided for corresponding data. For example, consider moving a cursor along the borehole trajectory while reviewing the log responses and/or square logs of one or more of the plots 1010, 1020 and 1030.

In the example of FIG. 10, agreement between the forward model and measured logs has been achieved, confirming the structural model and assigned layer properties. The plot 1001 is of synthetic image data and appears at the top of the GUI 1000 where the synthetic image data are generated by the gamma ray forward model (e.g., a forward model for gamma ray log responses). Note that the features shown on forward model gamma ray image plot 1001 are in good agreement with features shown on the measured density image plot 1010. An article entitled "Formation Evaluation in High Angle and Horizontal Wells—A New and Practical Workflow" by Griffiths et al., Society of Petrophysicists and Well Log Analysts (SPWLA) 53rd Annual Logging Symposium, Jun. 16-20, 2012, is incorporated by reference herein.

In FIG. 10, as mentioned, a reservoir is indicated along with a trajectory of the borehole. As an example, at least a portion of the results shown in FIG. 10 may be utilized for controlling a drilling process. For example, such a method can include controlling the direction of a drill bit of a drillstring via a rig. In such an example, the controlling can aim to drill in or into the reservoir.

When modeling neutron porosity, structural model property values initialized with measured logs tend to be unsuitable for direct use by a forward model process, which can make neutron modeling complicated and time consuming for an interpreter (e.g., for an interpretation process).

As an example, a method can process neutron data in a manner that facilitates interpretation. As an example, such a process may be "hidden" such that a user does not visibly see how such data are processed. In such an example, the user may be free from performing tasks associated with data preparation of neutron data. Such an approach can make neutron data more like one or more other types of data to thereby help streamline a workflow. For example, a user can run a "model, compare, update" workflow by modeling neutron measurements like one or more other measurements.

To forward model neutron porosity, a method can include utilizing migration length (Lm) as an input. However, various sensors (e.g., downhole tool sensors) do not provide Lm data; rather, they measure flux of neutrons. As an example, neutron flux may be measured by a sensor of a neutron tool where, after processing this measurement can be expressed as a count rate. As an example, a detector parameter can be the natural logarithm (Ln) of neutron count rate. As an example, measured logs available for initializing a neutron porosity property may be best thermal neutron porosity (BPHI) or thermal neutron porosity (TNPH or NPHI), each of which is not directly convertible to Lm.

A neutron porosity tool can be a tool that can make measurements that are sensitive to amount of hydrogen in a formation (e.g., and to a less extent upon other elements). An assumption may be made that a contribution to a measurement by elements other than hydrogen is negligible, and that the measurement of hydrogen comes from fluid that occupies a pore space of a formation. In a formation, however, elements other than hydrogen can exist in a material matrix and make a contribution to a measurement (e.g., chlorine in formation water, mud filtrates and in some evaporite formations, etc.); noting that hydrogen can be present in the material matrix (e.g., bound water in shales). As an example, a tool and/or a method may be calibrated such that porosity is given in particular units (e.g., limestone units, etc.). Pure limestone saturated with fresh water may be used as a basis for units as it tends to provide a measured signal for hydrogen indicative of hydrogen in pores of the limestone. As an example, one or more "corrections" or adjustments may be made for other lithologies or other fluids. As an example, a neutron porosity tool measurement can be impacted by various effects, which may stem from hydrocarbons, shale and/or chloride. As explained with respect to FIG. 7, a neutron log may be utilized to determine lithology. A neutron log response can vary with respect to lithology and/or one or more of the aforementioned affects. As an example, a method can include modeling one or more subsurface layer neutron porosity properties for one or more subsurface layers where the modeling provides for accurate corrections (e.g., adjustments that account for one or more factors). Some tool manufactures utilize correction curves, correction charts, etc., however, such approaches tend to demand user access to such curves, charts, etc., and an iterative manual process (e.g., layer by layer), which often results in a rough approximation. For example, a chart for obtaining porosity values for a few lithologies other than limestone may include values for adjustment of apparent limestone porosity units to porosity units for silica and dolomite.

Corrections can include adjustments to log measurements to bring them back to standard conditions for which a tool has been characterized. Neutron porosity measurements can involve, for example, corrections for temperature, pressure and a number of borehole and formation parameters.

As an example, a method can include utilizing a computational framework where a modeling approach can be actuated automatically and/or through user interaction (e.g., mouse, touchscreen, voice command, etc.) to generate a subsurface layer neutron porosity property values (e.g., as a log, etc.) where the modeling provides for accurate corrections (e.g., adjustments) of neutron tool measurements.

For neutron tools, a tool can measure the size of a neutron cloud, expressed as a function of a neutron macroparameter, migration length (Lm). For porosity tools, macroparameters can include, for example, slowing-down length (e.g., when epithermal neutrons are considered) and migration length (e.g., when thermal neutrons are considered). A macroparameter may be averaged over composition, geometry, and energy. As explained, a neutron "porosity" tool does not measure porosity directly; rather, such a tool can measure neutron migration length (Lm), which can then be utilized in determining porosity (e.g., or may be utilized directly as a proxy that is an estimate of porosity). As an example, a macroparameter model may be used to determine migration length from various types of information such as, for example, average porosity, matrix, and fluid types. The SUNPAR program (Schlumberger Limited, Houston, Tex.) is an example of a program that can be executed using computational resources to generate macroparameters for a variety of neutron and gamma ray transport tools. Once macroparameters are understood, they can be mapped into count-rate-ratio response of a particular tool design. As an example, mapping may utilize regression analysis of laboratory data (e.g., as taken with a particular tool, etc.).

As an example, to provide Lm, a method can include performing a conversion from BPHI or TNPH and density property to Lm. Such a method can be referred to as a reverse process where Lm is obtained iteratively by adjusting Lm to give an acceptable match on a BPHI or a TNPH target value. Given such a method, a user can model directly using a measured log (e.g., BPHI or TNPH), where the complexity of dealing with Lm can be hidden (e.g., executed without rendering of corresponding executional details to a display, etc.). For a user, the modeling of neutron porosity can be simplified, for example, akin to modeling another property. As an example, such a method may be implemented in a framework such as the TECHLOG framework (e.g., 3DP, etc.). For example, a framework can include one or more graphical controls that cause rendering of a dialog window that includes various options that may be user selectable and/or optionally prefilled (e.g., as defaults, for pre-determined or pre-known tool types, etc.). As an example, consider the GUI 1000 as including one or more features that can be actuate via input to a computing system (e.g., via touchscreen, a mouse, a stylus, a voice command, etc.), to cause rendering of a dialog window that provides for performing a conversion from BPHI or TNPH and density property to Lm.

As an example, measurements acquired in a borehole can be used to define formation geometry around the borehole and to populate various layer properties. External sources of geometrical information such as geological models or remote bed boundary inversion maps may be used to enhance understanding of the formation geometry around the borehole.

Interpretation aims to determine the position and properties of individual layers around a borehole. An interpretation workflow may include the following: Logs recorded in the borehole are first used to identify locations where the borehole path intersects layer boundaries; if available, image logs are used to calculate true and relative dips at each of the boundary crossings; a structural model is then constructed using the boundary locations and dips; individual layers in the structural model are then populated with log property values (e.g., one or more of gamma ray, vertical resistivity, horizontal resistivity, density, neutron porosity, and sigma); for layers that are intersected by the borehole, the measured logs are used to provide initial estimates of property values; for layers that are not crossed by the borehole, initial property values may be manually entered by the user where offset logs (from one or more offset wells, etc.) may provide an indication of the properties of non-crossed layers; forward model (FM) logs are then computed where the FM logs are a function of the actual borehole trajectory, structural model and layer properties; the FM logs are then compared to the measured logs; details of the structural model and layer properties are then adjusted (e.g., manually by the user and/or automatically) until there is good agreement between the measured and FM logs where an approach can be to build a model that may be a simplest model that is consistent with the logs; in such an example, the layer properties may be determined from the foregoing workflow and then used for petrophysical evaluation (e.g., rather than the measured logs).

As to neutron porosity modeling, a neutron forward model in 3DP can work in neutron migration length (Lm) and count rates. That is to say, the formation layers can be assigned with a migration length (Lm) property. The outputs of the forward model can be the near and far count rates expected from the neutron tool as it passes through the layers in a given borehole trajectory. As neutron porosity measurements can be lithology, density and fluid hydrogen index (HI) dependent, these factors can be taken into account when forward modeling a neutron porosity response. Users may be accustomed to working with neutron porosity (TNPH or BPHI), which are standard measurements used in petrophysical analysis, as mentioned a method can allow 3DP users to work with the more familiar neutron porosities rather than migration lengths or count rates. For example, a GUI can include a graphical control that allows for generation of one or more of those more familiar neutron porosities. As an example, such a GUI may be set to automatically perform operations such that the GUI renders one or more neutron porosities (e.g., as opposed to rendering migration lengths or count rates).

Upon initialization of a neutron porosity property, a neutron porosity square log can be generated for each desired layer to be analyzed; and it may be equal to either the median value or the min/max value of the input measured log (e.g., as chosen by a user or by default) between the entry point and the exit point of the trajectory into the layer.

Figure 11:
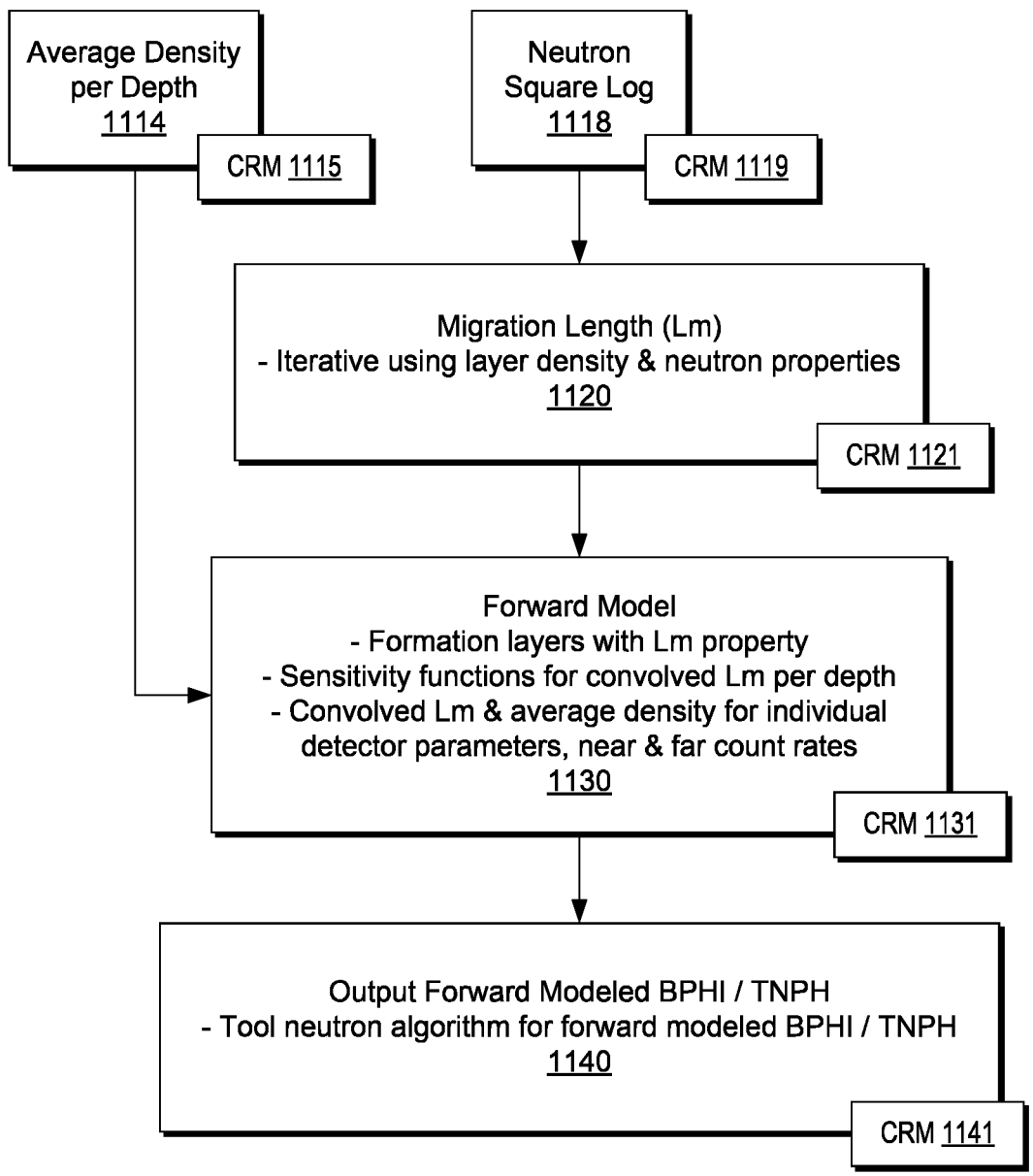
FIG. 11 illustrates an example of a method.

FIG. 11 shows an example of a method 1100 that includes reception blocks 1114 and 1118 for receiving average density per depth and a neutron square log, respectively, a migration length block 1120 for computing migration length (Lm) based at least in part on output of the neutron square log reception block 1118, a forward modeling block 1130 for forward modeling based at least in part on output of the migration length block 1120 and the average density per depth reception block 1114, and an output block 1140 for outputting forward modeled information (e.g., BPHI or TNPH).

The method 1100 of FIG. 11 can include receiving neutron data and density data for a borehole in a geologic formation per the blocks 1114 and 1118; determining a migration length value for a layer of the geologic formation based at least in part on the neutron data per the block 1120; forward modeling at least the layer based at least in part on the migration length value and the density data per the block 1130; and outputting, based at least in part on the forward modeling, modeled neutron data for the layer per the block 1140.

FIG. 11 also shows various computer-readable media (CRM) blocks 1115, 1119, 1121, 1131, and 1141. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format. As an example, the instructions 270 of the system 250 of FIG. 2 can include instructions of one or more of the CRM blocks 1115, 1119, 1121, 1131, and 1141 such that the system 250 can perform one or more actions of the method 1100 of FIG. 11. As an example, one or more application programming interfaces (APIs) may be utilized for making an API call to perform one or more actions of the method 1100. For example, a client device may make an API call to a server via a network to perform one or more of the actions of the method 1100 of FIG. 11. As an example, a graphical user interface (GUI) may be utilized to call for performance of one or more actions of the method 1100 of FIG. 11 (see, e.g., FIG. 18, FIG. 19, etc.), which may optionally be via one or more API calls or one or more other types of calls, commands, instructions, etc.

As shown in FIG. 11, the migration length (Lm) can be computed via an iterative algorithm using layer density and neutron properties along with one or more assumptions as to conditions. As shown, the forward model can provide for formation layers with the Lm property, sensitivity functions that compute a convolved Lm per depth and convolved Lm and average density used to compute individual detector parameters and then near count rates and far count rates. As shown, the output can be processed via a tool neutron algorithm that computes forward modeled BPHI or TNPH under, for example, one or more assumptions as to conditions.

As an example, neutron flux may be measured by a sensor of a neutron tool where, after processing this measurement can be expressed as a count rate. As an example, a detector parameter can be the natural logarithm (Ln) of neutron count rate.

As mentioned, a method can include utilizing a computational framework where a modeling approach can be actuated automatically and/or through user interaction (e.g., mouse, touchscreen, voice command, etc.) to generate a subsurface layer neutron porosity property values (e.g., as a log, etc.) where the modeling provides for accurate corrections (e.g., adjustments) of neutron tool measurements. In the example of FIG. 11, the method 1100 can provide for neutron porosity property values such as, for example, BPHI and/or TNPH (see also, e.g., the workflow 1800 of FIG. 18). Such a method may provide for Lm based neutron porosity property values (e.g., via determination of Lm values). For example, a method can convert measured neutron property data to Lm based neutron porosity values. As an example, an output may be in the form of a square log such as a BPHI square log or a TNPH square log. As explained, a layer-based approach can account for geometric effects such as, for example, those that can impact HaHz borehole neutron tool measurements (e.g., consider smearing). As an example, a computational framework can include a graphical user interface that can be utilized to process neutron tool measurements for a plurality of layers and output one or more types of neutron porosity property logs (e.g., BPHI, TNPH, BPHI square, TNPH square, etc.).

Figure 12:
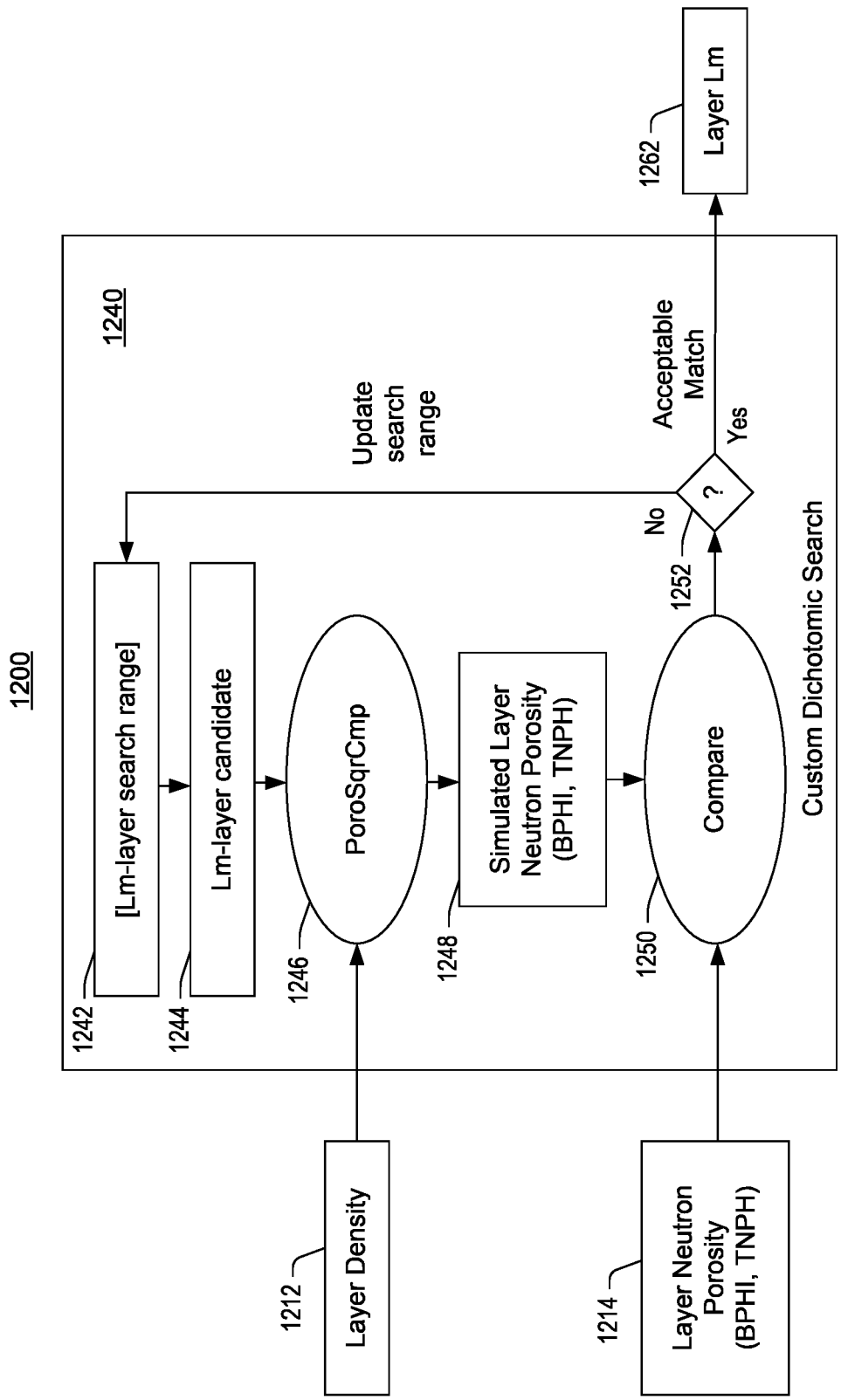
FIG. 12 illustrates an example of a method.

FIG. 12 shows an example of a method 1200, which may be referred to as a dichotomic search workflow. As an example, a dichotomic search may include selecting between alternatives (dichotomies). The method 1200 includes an input 1212 for reception of layer density and an input 1214 for reception of layer neutron porosity (e.g., BPHI or TNPH). The method 1200 includes a core process 1240 that can utilize the inputs 1212 and 1214 for generation of an output 1262 for output of layer Lm, which may be utilized, for example, in the method 1100 of FIG. 11 (see, e.g., the migration length (Lm) block 1120. As shown in FIG. 12, the core process 1240 can receive a Lm-layer search range 1242, select a Lm-layer candidate 1244, perform a porosity squared computation (PoroSqCmp) 1246, generate a simulated layer neutron porosity (e.g., BPHI and/or TNPH) 1248, perform a comparison between the simulated layer neutron porosity 1248 and the received layer neutron porosity of the input 1214 such that a decision block 1252 can decide if an acceptable match exists (see, e.g., "yes" branch) or, for example, whether to update a search range (see, e.g., "no" branch). As shown, where an acceptable match exists, the core process 1240 of the method 1200 can output a layer Lm via the output 1262. As an example, the output 1262 of the core process 1240 can be operatively coupled to the block 1120 of the method 1100 of FIG. 11 (see also, e.g., the workflow 1800 of FIG. 18).

As shown in FIG. 12, inputs can include layer density and layer neutron porosity (e.g., BPHI or TNPH) for output of layer Lm. The output can be based on various computations that include the porosity squared computation (PoroSqCmp), a simulated layer neutron porosity computation and a comparison of simulated and input BPHI or TNPH. Where the comparison is acceptable (e.g., error less than a predetermined amount, etc.), the method 1200 can output the layer Lm, which, as shown, can be from a search range for a layer and a selected candidate in the search range. Where the comparison is not acceptable, the method 1200 can, for example, update the search range for Lm.

Figure 13:
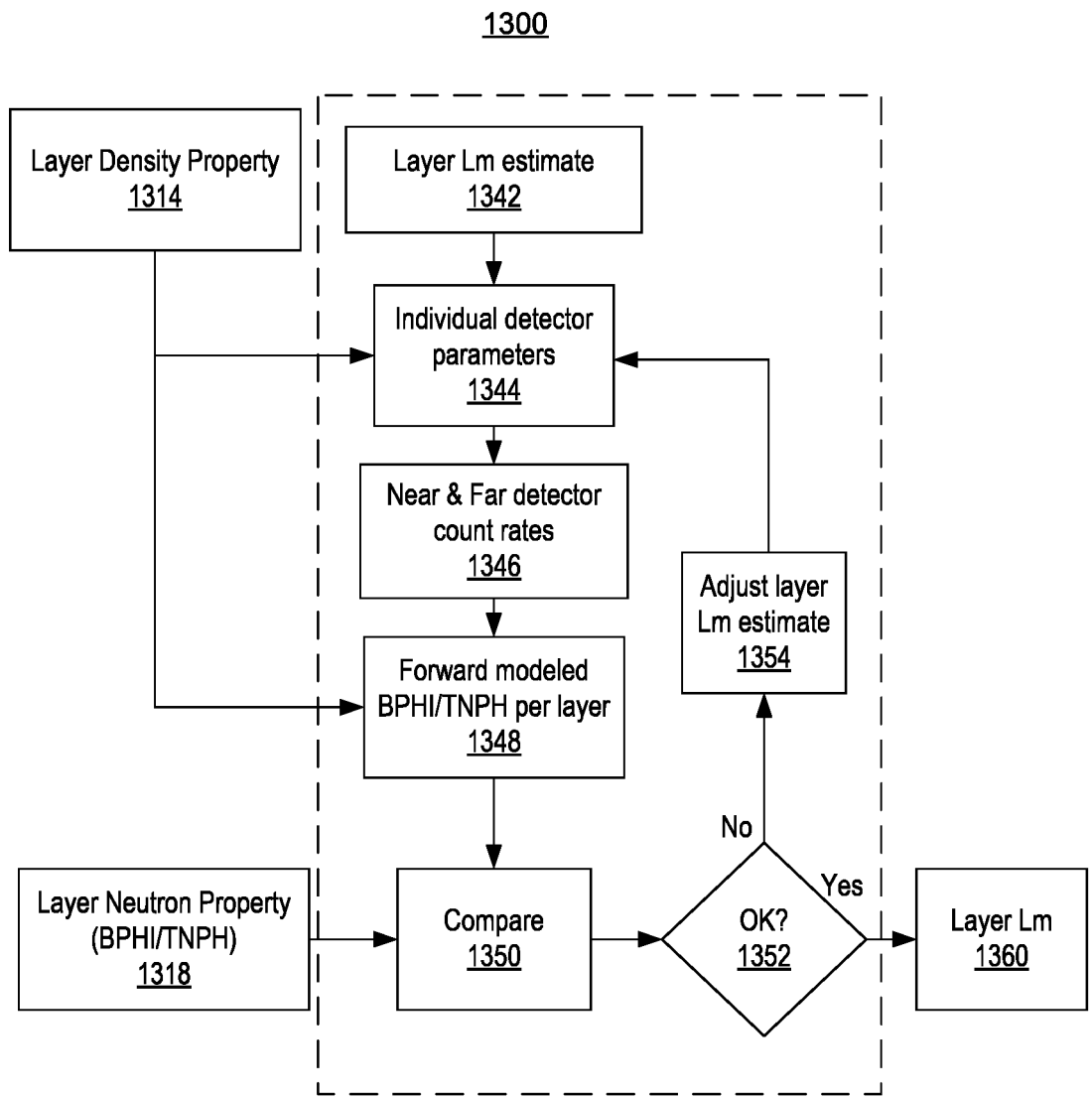
FIG. 13 illustrates an example of a method.

FIG. 13 shows an example of a method 1300, which includes various actions that may be implemented in the method 1200 of FIG. 12. The method 1300 includes reception blocks 1314 and 1318 for receiving layer density property and layer neutron property, respectively, a layer Lm estimate block 1342 for estimating a layer Lm, an individual detector parameter block 1344 for determining individual detector parameters based at least in part on the layer Lm estimate and layer density property, a near and far detector count rates block 1346 for computing near and far detector count rates, a forward modeling block 1348 for forward modeling BPHI or TNPH (e.g., or BPHI and TNPH) per layer (e.g., based on count rates and layer density property), a comparison block 1350 for comparing forward modeled result(s) to received layer neutron property(ies), a decision block 1352 for deciding whether the comparison is acceptable (e.g., as to a difference or differences), and an output block 1360 for outputting a layer Lm per the layer Lm estimate where the comparison is acceptable; otherwise, the method 1300 can continue to an adjustment block 1354 for adjusting the layer Lm estimate, which may be performed in one or more manners to provide a layer Lm estimate to the individual detector parameters block 1344. As shown in FIG. 13, layer density and neutron porosity property are utilized for the neutron forward modeling. The method 1200 and the method 1300 may be referred to as inversion methods (e.g., inversion of information to determine Lm property).

As an example, a workflow can include initialization of layer migration length (Lm) property where, for each layer, an initialized layer neutron porosity property can be used along with layer density to determine a layer Lm property, which may be achieved via an inversion (see, e.g., the method 1200 and the method 1300). An inversion methodology can use a neutron forward modeling algorithm. An inversion can minimize the difference between layer neutron porosity property (e.g., as based either on TNPH or BPHI) and forward modeled layer TNPH/BPHI. As shown in FIGS. 12 and 13, a Lm value corresponding to the lowest difference can be identified as the input layer Lm for a next step where iterations in a loop can be performed until a comparison is acceptable (e.g., according to one or more criteria). As an example, an inversion algorithm may assume an individual layer is of infinite thickness.

As an example, a layer Lm along with the well trajectory can be provided to 3D sensitivity functions to determine a convolved Lm per depth. The convolved Lm can represent the sum of the contribution of individual grid cells of a grid cell model around the tool (e.g., as defined in the sensitivity functions) into the measured signal. As to a grid cell model, consider the graphical representation of the model 850 in FIG. 8, which is shown as an inset in the lower right of a grid cell model with grid cells that can be utilized to model a region about a tool.

The convolved Lm along with the average density can be used to compute the detector parameters. A detector parameter can be the natural logarithm (Ln) of neutron count rate and can be computed for near and far detectors. Forward modeled neutron count rates can be computed accordingly for near and far detectors. These can duplicate the measured detector count rates at standard conditions in which a tool is characterized (e.g. fresh water-filled Limestone, 8-in borehole, 60 F temperature, zero mud and formation salinity for ECOSCOPE 675 tool).

The forward modeled count rates can be provided to the neutron tool processing algorithm which can ultimately provide forward modeled TNPH and/or BPHI where the algorithm may assume standard conditions.

As an example, BPHI can be a type of hydrogen index (HI) related parameter such as the "Best Thermal Neutron Porosity (Ratio Method)" associated with a tool such as the ECOSCOPE tool (Schlumberger Limited, Houston, Tex.). A BPHI measurement may include full correction of far count rates for a density effect. TNPH can be the "Thermal Neutron Porosity (Ratio Method)" associated with a tool such as the ECOSCOPE tool. As mentioned, NPHI can be utilized (see, e.g., mnemonics of Schlumberger Limited, Houston, Tex. where a NPHI parameter can be a mnemonic for "Thermal Neutron Porosity (original Ratio Method) in Selected Lithology"). The aforementioned parameters BPHI, TNPH and NPHI are neutron porosity property parameters (e.g., neutron porosity properties).

Migration length (Lm) represents the combination of the path travelled by a neutron during the slowing-down phase (Ls) and the distance travelled in the thermal phase before being captured (Ld):

$$Lm = Ls^2 + Ld^2$$

The slowing-down length, Ls, is proportional to the root-mean-square distance that a neutron covers between the time it is emitted from the source at high energy to the time it reaches a much lower energy, such as the lower edge of an epithermal energy region.

The diffusion length, Ld, can be thought of as the rectified distance a thermal-energy neutron travels between the point at which it became thermal until its final capture.

With known source to detector spacing, the migration length (Lm) is a parameter characteristic of the formation lithology and fluid content. It can be used internally by an algorithm as a formation property of a layered earth model in a forward modeling process.

An Lm-based neutron porosity forward model can convert a migration length (Lm) layer property and a density layer property to a TNPH or a BPHI property. As an example, a model utilized in forward modeling can include one or more layers. As an example, a multi-layer model of a formation may be utilized. FIG. 10 shows an example of a multi-layer model that includes various properties, property boundaries and a trajectory of a borehole that can cross one or more layer boundaries. As shown the trajectory passes through one or more reservoir layers (e.g., pay zones, etc.). Various types of data are also shown in FIG. 10 as, for example, logs as acquired by one or more sensors of one or more downhole tools.

Figure 14:
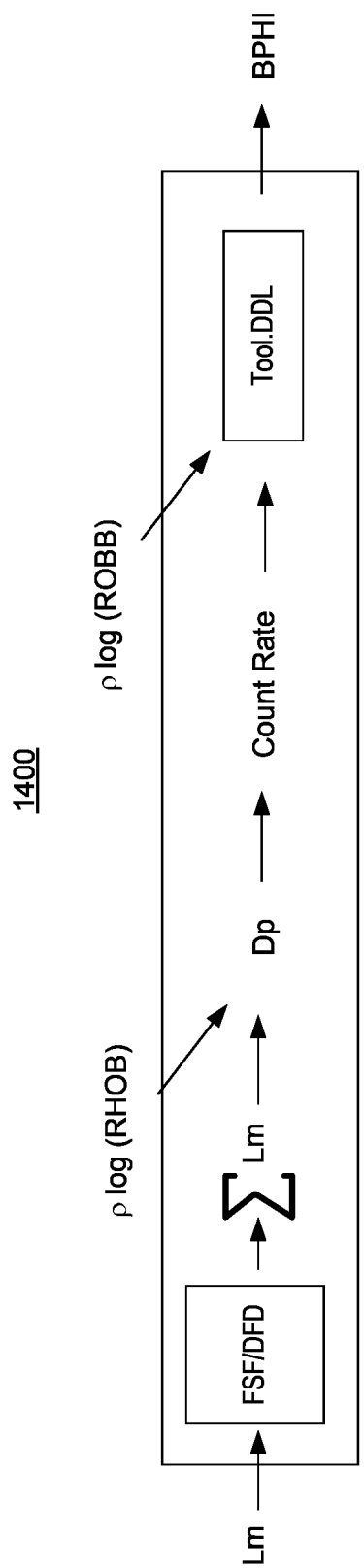
FIG. 14 illustrates an example of a method.

FIG. 14 shows a schematic 1400 of an example of a conversion process for computing BPHI or TNPH from Lm. As mentioned, a method may provide for Lm based neutron porosity property values (e.g., via determination of Lm values). For example, a method can convert measured neutron property data to Lm based neutron porosity values. In the example of FIG. 14, Lm is populated in each layer and a borehole in the layered earth model can be convolved, for example, using a 3D Flux Sensitivity Function (FSF) maps. A minor adjustment can be applied to the convolved Lm using a technique called diffusion adjustment with a separate set of maps referred to as DFD. As shown, a tool parameter ROBB can be utilized, which corresponds to a tool such as an ECOSCOPE tool (e.g., ROBB is an acronym for bulk density, bottom quadrant; whereas, ROBU is an acronym for a tool-face bulk density, upper quadrant). As an example, a tool may output values for parameters such as LQC.RHOB and LQC.ROBB where LQC is an acronym for log quality control (e.g., consider parameters of an ECOSCOPE tool).

As an example, a detector specific count rate can be computed for near and far detectors from the convolved Lm and a density log (e.g., RHOB). For example, consider the following example pseudocode:

effectiveLm=$E1*Lm*Lm+E2*Lm+E3$;

Fp_far=pow (effectiveLm, $EF1$)+$EF2$*density;

Dp_far=$DF1*Fp$_far*$Fp$_far+$DF2*Fp$_far+$DF3$;

CountRate_Far=exp($Dp$_far);

$Fp\_near = \text{pow (effectiveLm, } FN1) + FN2*\text{density}*\text{effectiveLm};$ $Dp\_near = DN1*Fp\_near*Fp\_near + DN2*Fp\_near + DN3;$ $CountRate\_Near = \exp(Dp\_near);$ Above, the terms E1, E2, E3, EF1, EF2, DF1, DF2, DF3, DN1, DN2, and DN3, are constants. Near and far count rates can be converted and density corrected to neutron porosity outputs using the EC (Environmental Correction) algorithm defined in the ECOSCOPE EcoScope.dll (dynamic link library).

Figure 15:
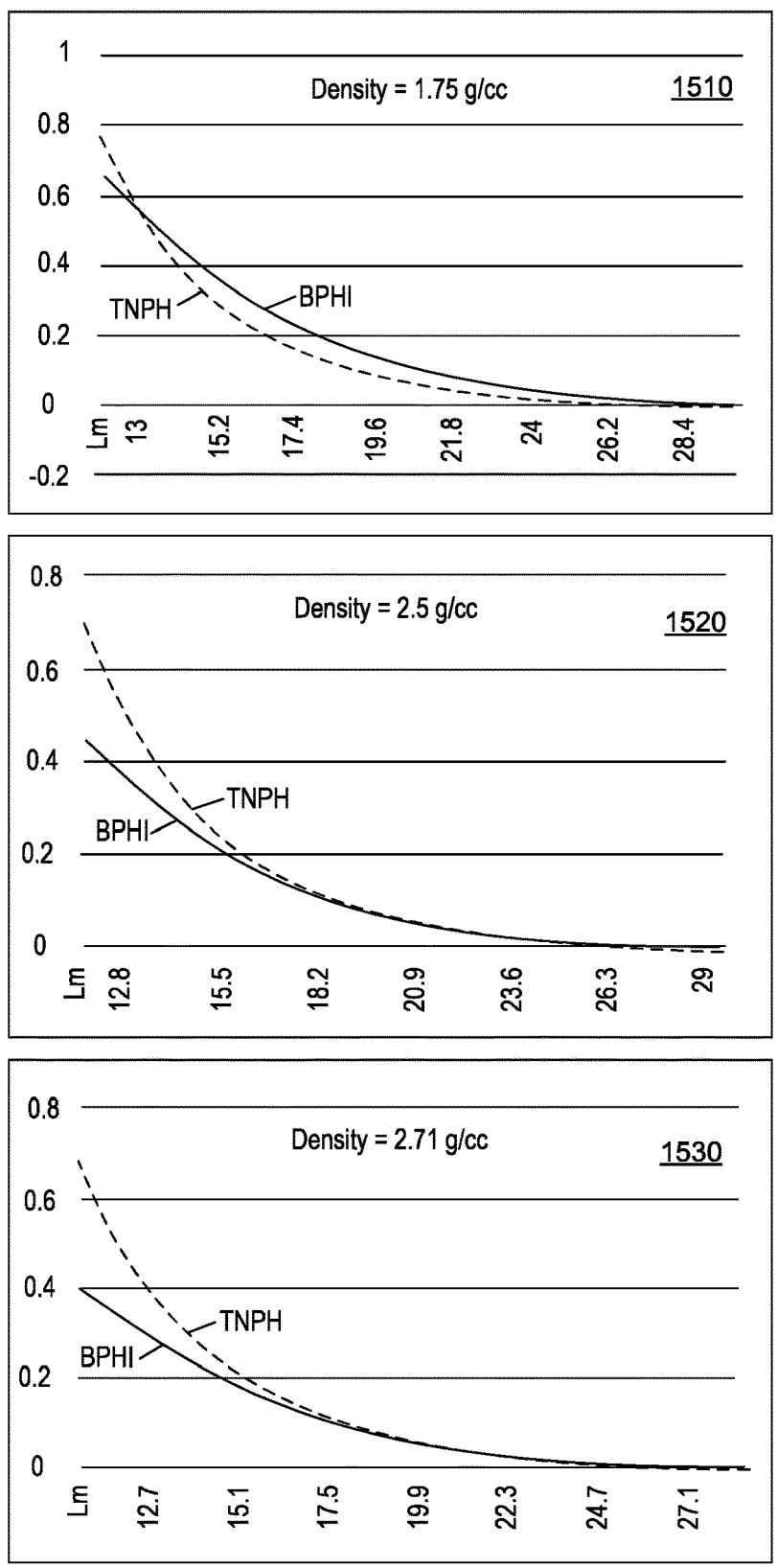
FIG. 15 illustrates example plots.

FIG. 15 shows three example plots 1510, 1520 and 1530 of Lm to porosity, each for a given density (e.g., 1.75 g/cc, 2.5 g/cc and 2.71 g/cc). Specifically, each of the plots 1510, 1520 and 1530 shows values of BPHI and TNPH versus Lm. The plots 1510, 1520 and 1530 demonstrate relationships with respect to Lm and density.

As to converting from measured neutron property to Lm based neutron porosity, when modeling neutron porosity for 3DP, initial estimates of layer properties can be performed using measured neutron porosity logs (e.g., BPHI and TNPH). The estimate of the neutron porosity based on TNPH or BPHI logs cannot be used directly by the Lm based forward model as the example Lm based neutron forward modeling approach accepts Lm as an input. Referring again to FIG. 12, the PoroSqrCmp can be a forward model that can provide conversion of Lm to neutron property. As an example, to compute Lm, a reverse process of PoroSqrCmp (Lm to BPHI or TNPH) can be performed. For example, Lm can be obtained by iteratively adjusting Lm to give good match to the target value of BPHI or TNPH for each layer.

Consider defining $f_{Lm}$ as the function that performs layer property conversion in PoroSqrCmp:

$f_{Lm}, (Lm, Rho) \rightarrow (BPHI, TNPH)$

As shown, the $f_{Lm}$ function that converts from layer Lm and density to layer BPHI/TNPH; noting that $f_{Lm}$ may be defined on the following ranges: Lm: [12, 30] defined between 12 cm and 30 cm.

As mentioned, a method can aim to find Lm so $f_{Lm}$ (Lm)=Layer neutron porosity (BPHI or TNPH). With layer neutron property being initialized from BPHI or TNPH, layer properties may be considered constant for each layer in a model. For a single layer, $f_{Lm}$ can be simplified to:

$f_{Lm}(Lm) \rightarrow (BPHI, TNPH)$

To find $(f_{Lm}(Lm))^{-1}$ a condition can be that $f_{Lm}$ (Lm) is monotonous. For example, it can be known that Lm is defined on [12, 30] interval and $f_{Lm}$ (Lm) is monotonous.

In a monotonous range, a method can employ a custom dichotomic search. The custom dichotomic search algorithm can iteratively reduce the Lm initial range using the following workflow:

compute $neutron_{candidate} = f_{Lm}(Lm_{candidate})$:
$Lm_{candidate} = (Range_{min} + Range_{max})2,$ compare $neutron_{candidate}$ with measured property BPHI or TNPH, update search range until $neutron_{candidate}$ matches measured property estimate, when matching is good, use $Lm_{candidate}$ as the good candidate.

FIG. 16 shows an example listing 1600 of pseudocode for performing a custom dichotomic search method. As shown, the method can return the Lm porosity value from a measured property value (e.g., BPHI or TNPH) and layer density value. As an example, a method may utilize a polynomial approach. For example, a function may be a polynomial function (see, e.g., example pseudocode above).

As explained, forward modeling of neutron porosity demands migration length (Lm) as an input while sensors measure and provide neutron flux data, not Lm data. Measured logs available for initializing a neutron porosity property can be BPHI and TNPH, which are not readily convertible to Lm. As an example, a method can include performing a conversion from BPHI or TNPH and density property to Lm. Such a method can be a "reverse" process (e.g., an inversion) where Lm is obtained iteratively by adjusting Lm to achieve an acceptable match on a BPHI or a TNPH target value. In such an approach, a user can model directly using measured log and complexities of dealing with Lm can be "hidden". Such an approach can make, from a user standpoint, modeling of neutron porosity readily available, which can expedite a workflow.

FIG. 17 shows example graphical user interfaces (GUIs) 1710 and 1750 that include GUIs 1715 and 1755 for processing acquired data to characterize a geologic formation (e.g., via interpretation, etc.). The GUIs of FIG. 17 can be part of a framework or one or more components that can be operatively coupled to a framework. In the example of FIG. 17, the GUI 1755 implements a detector parameter concept where Lm is utilized. As shown, a GUI can allow for selection of a LWD tool, selection of a density for a detector parameter computation and a density correction source. Such selections can be utilized in forward modeling. The GUI 1755 can be implemented in a manner that can improve determinations as to hydrocarbon saturation in a geologic formation (e.g., with respect to time, ease, etc.). Such a system may be implemented in a manner where various actions are hidden from a user that utilizes the system via an interactive GUI or GUIs. As explained, Lm may be utilized in a hidden process that facilitates a workflow, which may be utilized for hydrocarbon saturation determinations in one or more layers through which a borehole may pass. As explained, a workflow may include drilling, which may be directional drilling, which may be in a high angle horizontal well (HaHz). As an example, a workflow may include one or more of installing completion components, perforating a tubular, fracturing a formation, etc.

In the example of FIG. 17, the GUIs 1750 and 1755 demonstrate an approach that can expedite analysis, for example, by a three-to-one reduction in information where the information, as reduced, is in a more readily understandable form. As shown, the GUI 1710 includes a thick lined box around TNPH_SQR, BPHI_SQR, and Neutron (AWLNP)_SQR, which can be reduced as shown in the GUI 1750 to Neutron_SQR. The approach can be referred to as a detector parameter concept approach where a neutron porosity can be rendered as an alternative or in addition to migration length (Lm) and/or count rate. Such an approach can facilitate a user's review and performance of a workflow.

In the foregoing example, the "Neutron_SQR" can be a square log of a neutron porosity property. A neutron porosity square log can be more readily understandable than instrument measurements such as count rate. In various instances, a workflow can be facilitated through operations that can readily render neutron porosity (e.g., TNPH or BPHI) types of values to a display (e.g., rather than rendering of migration length values and/or count rate values).

FIG. 17 also shows information graphics that can provide information to assist a user in a workflow or workflows. One graphic pertains to supported variables (e.g., "Variable (with 'Bulk Density' family) present in THL window that has 'RHOB' in name, recommended to use measured RHOB") and another graphic pertains to density (e.g., "BOTTOM density (ROBB) used for processing measured neutron porosity (BPHI_FILT). Recommended to use that variable for Forward Modeling. Supported variables (from dataset 'DVM_XYY_60B'): Variable present in THL window with bulk density family (except ROBB_shifted)"). In such example, for the ECOSCOPE tool, BPHI_FILT is an acronym for "Filtered Best Thermal Neutron Porosity (Ratio Method) in Selected Lithology".

Figure 18:
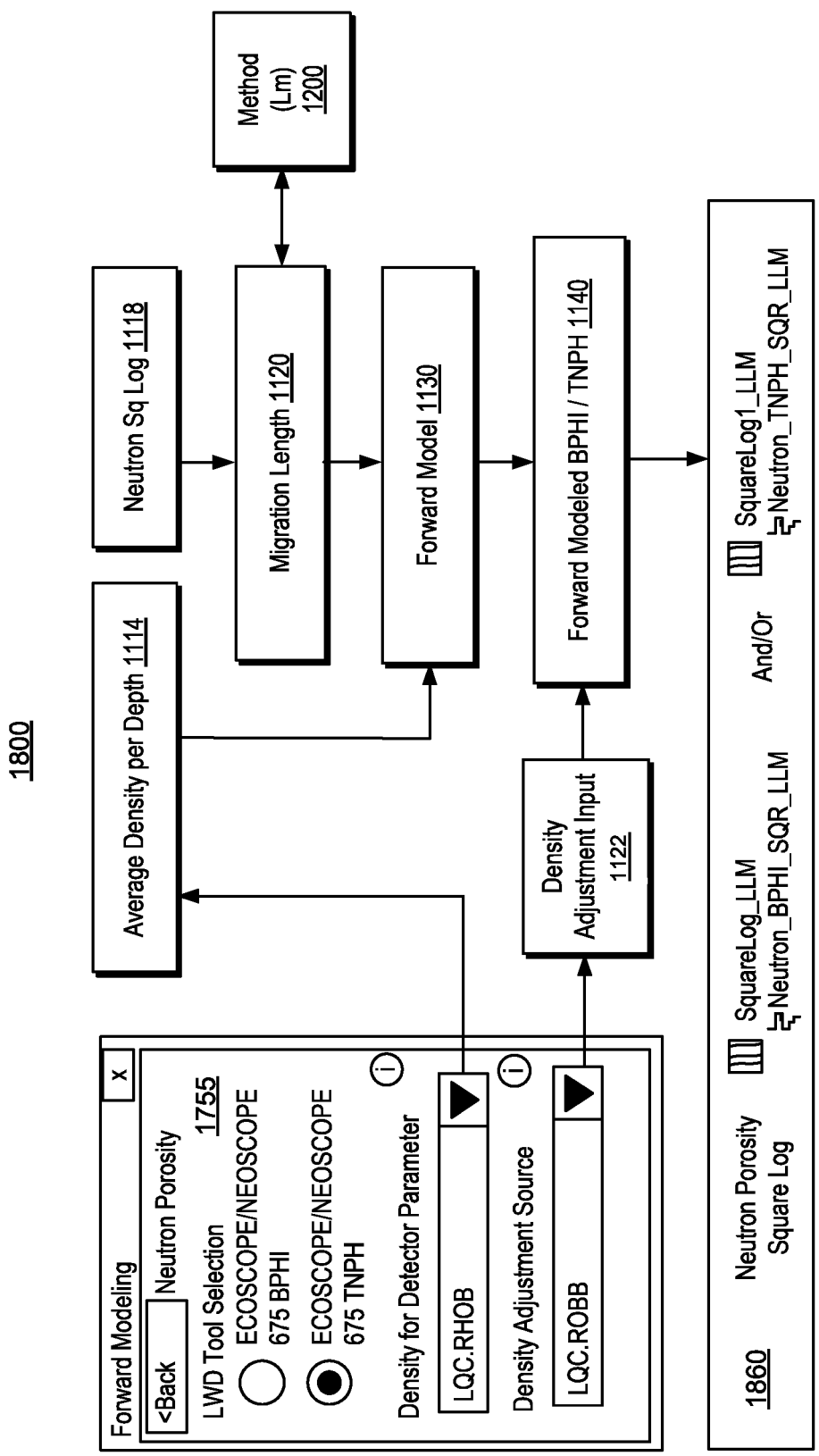
FIG. 18 illustrates an example of a workflow that includes one of the GUIs of FIG. 17, the method of FIG. 11 and reference to the method of FIG. 12.

FIG. 18 shows an example of a workflow 1800 of a framework such as a petrophysical framework (e.g., consider TECHLOG framework, etc.). As shown, a GUI such as the GUI 1755 of FIG. 17 may be rendered to a display where various graphical controls can drive various portions of the method 1100 of FIG. 11, which is shown as including a density adjustment input block 1122 that is operatively coupled to the forward modeling block 1140. The GUI 1755 includes a field for density for a detector parameter (e.g., LQC.RHOB) and a field for a density adjustment source (e.g., LQC.ROBB). These two fields can be utilized to inform the method 1100 to perform forward modeling, for example, in a manner that determines Lm using the method 1200 of FIG. 12. As shown, the workflow 1800 can include an output block 1860 for output of one or more types of neutron porosity square logs (e.g., BPHI and/or TNPH or NPHI). As an example, the workflow 1800 may be implemented in a global layer mode (see, e.g., the method 900 of FIG. 9).

As mentioned, a method may provide for Lm based neutron porosity property values (e.g., via determination of Lm values and an appropriate Lm based function for neutron porosity property values). For example, a method can convert measured neutron property data (e.g., detector parameter values, etc.) to Lm based neutron porosity values. As mentioned, neutron flux may be measured by a sensor of a neutron tool where, after processing this measurement can be expressed as a count rate. As an example, a detector parameter can be the natural logarithm (Ln) of neutron count rate.

Figure 19:
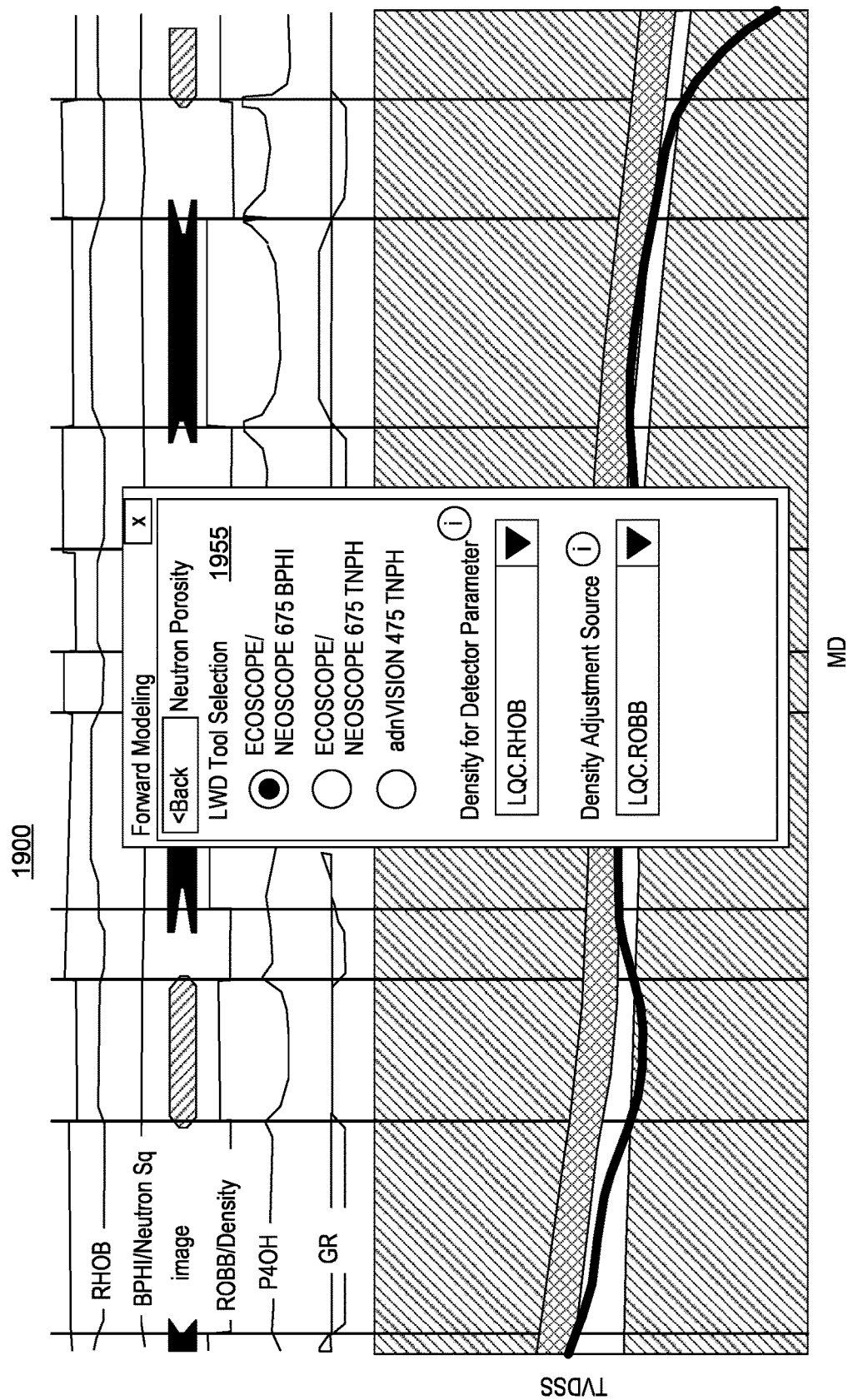
FIG. 19 illustrates examples of graphical user interfaces.

FIG. 19 shows an example of a graphical user interface (GUI) 1900 and a GUI 1955, which can be a dialog box or dialog window that provides for using a forward modeling approach as to neutron porosity. For example, consider the GUI 1955 as being operable within the example workflow 1800 of FIG. 18. As shown, a user may be reviewing log responses for a particular region that includes a borehole with associated log responses where the borehole has a trajectory that can be rendered with respect to total vertical depth (TVD) and measured depth (MD), or alternatively, for example, an appropriate lateral or horizontal dimension (e.g., for a lateral well, MD and lateral dimension may provide for a relatively similar display of a trajectory).

As shown in the example of FIG. 19, the GUI 1955 includes a field for a density for detector parameter (e.g., density for detector parameter computations) and a field for a density correction source (e.g., density adjustment source). These fields can be utilized as in the workflow 1800 of FIG. 18 (see, e.g., the input block 1114 for average density per depth and the input block 1122 for density adjustment).

The GUI 1900 may be accessed as part of a workflow. For example, consider a workflow that involves three-dimensional petrophysics (3DP). As an example, consider a workflow that involves using the TECHLOG framework where various tools of the 3DP functionality may be rendered to a display (e.g., as a GUI, etc.). In such an example, log data may be available for a borehole that includes one or more portions that are not perpendicular to a boundary between formation layers. In such an example, a user may desire to operate without count rates or migration lengths but rather to operate with neutron porosity that can be presented in a more directly understandable manner. The user may utilize an input device (e.g., touchscreen, mouse, voice command, etc.) to cause the framework to execute one or more programs for rendering neutron porosity information to a display. The user may then assess various boundaries, layers, etc., with respect to the trajectory. The user may then determine whether the trajectory is in an appropriate reservoir region (e.g., a pay zone). As explained, a workflow can operate to simplify rendering of neutron information, particularly when compared to approaches that render migration length and/or count rates.

As an example, as a workflow may involve a borehole trajectory that includes one or more lateral portions (e.g., deviated portions), the workflow can utilize a simpler approach to rendering of neutron information, which may facilitate workflows as to one or more of perforations, completions, fracturing, etc. For example, consider utilizing a GUI such as the GUI 1900 for determining where to form perforations, where to install a completion component, where to fracture surrounding formation material, etc. As an example, a workflow can include making one or more of such determinations and then issuing a command to perforate a casing, issuing a command for installing a completion component, issuing a command for fracturing, etc. In such examples, perforating, installing, issuing, etc., can be performed, for example, followed by production of fluid from a targeted reservoir intersected by at least a portion of the borehole trajectory.

As an example, a process can utilize a migration length that represents various interactions of neutrons with material (e.g., liquid, gas, oil, water, salt, lithology, etc.). A published U.S. patent application, with Publication No. US20160130916 A1, entitled "Local layer geometry engine with work zone generated from buffer defined relative to a wellbore trajectory" to Abadie et al., is incorporated by reference herein (Ser. No. 14/933,768, filed 5 Nov. 2015).

A method can include receiving neutron data and density data for a borehole in a geologic formation; determining a migration length value for a layer of the geologic formation based at least in part on the neutron data; forward modeling at least the layer based at least in part on the migration length value and the density data; and outputting, based at least in part on the forward modeling, modeled neutron data for the layer. In such an example, the borehole can be a high angle borehole where, for example, the received neutron data includes smearing due to the high angle of the borehole with respect to the layer (see, e.g., FIG. 8, FIG. 19, etc.).

As an example, a method can include determining a migration length value accounts for the geometry of the borehole. As an example, a method can include determining a migration length value by implementing an iterative loop and one or more stopping criteria. As an example, a method can include determining a migration length value by implementing a dichotomic search.

As an example, determining a migration length value can include forward modeling of at least one of BPHI and TNPH at least for the layer.

As an example, neutron data can be or include BPHI data and/or TNPH data. As an example, a downhole tool may output information for computation of a neutron square log. As mentioned, a method can include utilizing a migration length in a workflow that operates on neutron and density data. A neutron square log can be a neutron layer property as defined from input measurements from a tool (e.g., ECOSCOPE tool, etc.); noting that an average density per depth can be acquired via such a tool (e.g., a measurement of the tool). As an example, a system can be operatively coupled to a tool such as a downhole LWD tool.

As an example, a method can include simulating physical phenomena in a geologic formation based at least in part on output modeled neutron data for a layer. Such a method can include issuing a signal to at least one piece of equipment that interacts with the geologic formation.

As an example, neutron data can be logging while drilling (LWD) data acquired by a downhole tool during a drilling operation in a geologic formation.

As an example, a method can include receiving neutron data from a LWD tool during a drilling operation and, for example, can include controlling the drilling operation based at least in part on the modeled neutron data. For example, consider directing a drill bit with respect to a reservoir in the geologic formation where the modeled neutron data represent porosity characteristics of the reservoir.

As an example, a method can include rendering a graphical user interface to a display where the graphical user interface include a representation of a model of at least a portion of the geologic formation and a representation of at least a portion of the borehole. In such an example, the graphical user interface can include one or more graphical tools for adjusting one or more boundaries of one or more layers.

As an example, a method can include determining hydrocarbon saturation (e.g., and/or water saturation) based at least in part on modeled neutron data for a layer. In such an example, drilling may aim to drill a well for production of fluid that includes at least hydrocarbons.

As an example, a system can include a processor; memory operatively coupled to the processor; and processor-executable instructions stored in the memory to instruct the system to: receive neutron data and density data for a borehole in a geologic formation; determine a migration length value for a layer of the geologic formation based at least in part on the neutron data; forward model at least the layer based at least in part on the migration length value and the density data; and output, based at least in part on the forward modeling, modeled neutron data for the layer.

As an example, one or more computer-readable storage media can include computer-executable instructions executable to instruct a computing system to: receive neutron data and density data for a borehole in a geologic formation; determine a migration length value for a layer of the geologic formation based at least in part on the neutron data; forward model at least the layer based at least in part on the migration length value and the density data; and output, based at least in part on the forward modeling, modeled neutron data for the layer.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2.

Figure 20:
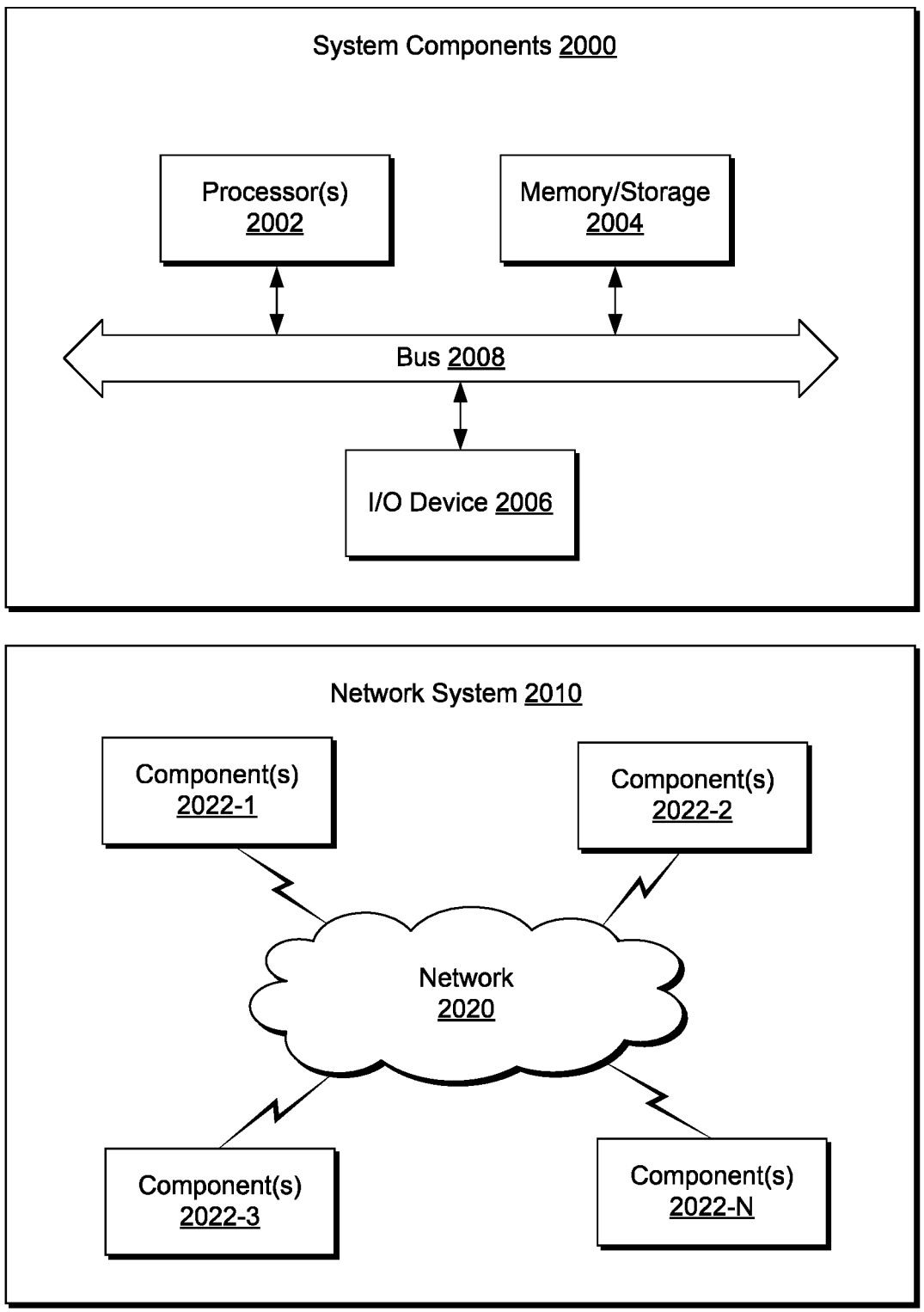
FIG. 20 illustrates example components of a system and a networked system.

FIG. 20 shows components of an example of a computing system 2000 and an example of a networked system 2010. The system 2000 includes one or more processors 2002, memory and/or storage components 2004, one or more input and/or output devices 2006 and a bus 2008. In an example embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2022-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving neutron data and density data for a high angle borehole in a geologic formation, wherein the neutron data comprises smearing due to the high angle of the borehole with respect to a layer of the geological formation;
determining a migration length value for the layer of the geological formation based at least in part on the neutron data;
forward modeling at least the layer of the geological formation based at least in part on the migration length value and the density data; and
outputting, based at least in part on the forward modeling, modeled neutron data for the layer of the geological formation.

2. The method of claim 1, wherein the determining the migration length value accounts for geometry of the high angle borehole.

3. The method of claim 1, wherein the determining the migration length value comprises implementing an iterative loop and one or more stopping criteria.

4. The method of claim 1, wherein the determining the migration length value comprises implementing a dichotomic search.

5. The method of claim 1, wherein the determining the migration length value comprises forward modeling of at least one of: best thermal neutron porosity and thermal neutral porosity at least for the layer of the geological formation.

6. The method of claim 1, wherein the neutron data comprises best thermal neutron porosity data.

7. The method of claim 1, wherein the neutron data comprises thermal neutron porosity data.

8. The method of claim 1, further comprising simulating physical phenomena in the geological formation based at least in part on the output modeled neutron data for the layer of the geological formation.

9. The method of claim 8, further comprising issuing a signal to at least one piece of equipment that interacts with the geological formation.

10. The method of claim 1, wherein the neutron data comprises logging while drilling data acquired by a downhole tool during a drilling operation.

11. The method of claim 1, wherein the receiving comprises receiving the neutron data from a logging while drilling tool during a drilling operation.

12. The method of claim 11, further comprising controlling the drilling operation based at least in part on the modeled neutron data.

13. The method of claim 12, wherein the controlling comprises directing a drill bit with respect to a reservoir in the geological formation, and wherein the modeled neutron data represent porosity characteristics of the reservoir.

14. The method of claim 1, further comprising rendering a graphical user interface to a display, wherein the graphical user interface comprises a representation of a model of at least a portion of the geological formation and a representation of at least a portion of the high angle borehole.

15. The method of claim 14, wherein the graphical user interface comprises graphical tools for adjusting one or more boundaries of one or more layers of the geological formation.

16. The method of claim 1, further comprising determining hydrocarbon saturation based at least in part on the modeled neutron data for the layer of the geological formation.

17. A system comprising:
a processor;
memory operatively coupled to the processor; and
processor-executable instructions stored in the memory to instruct the system to:
receive neutron data and density data for a high angle borehole in a geological formation, wherein the neutron data comprises smearing due to the high angle of the borehole with respect to a layer of the geological formation;
determine a migration length value for the layer of the geological formation based at least in part on the neutron data;
forward model at least the layer of the geological formation based on the migration length value and the density data; and
output, based at least in part on the forward modeling, modeled neutron data for the layer of the geological formation.

18. One or more computer-readable storage media comprising computer-executable instructions executable to instruct a computing system to:
receive neutron data and density data for a high angle borehole in a geological formation, wherein the neutron data comprises smearing due to the high angle of the borehole with respect to a layer of the geological formation;
determine a migration length value for the layer of the geological formation based at least in part on the neutron data;
forward model at least the layer of the geological formation based at least in part on the migration length value and the density data; and
output, based at least in part on the forward modeling, modeled neutron data for the layer of the geological formation.

19. The system of claim 17, wherein the processor-executable instructions stored in the memory to instruct the system to determine the migration length value comprises processor-executable instructions stored in the memory to instruct the system to determine the migration length value to accounts for geometry of the high angle borehole.

20. The one or more computer-readable storage media of claim 18, wherein the computer-executable instructions executable to instruct the computing system to determine the migration length value comprises computer-executable instructions executable to instruct the computing system to determine the migration length value to accounts for geometry of the high angle borehole.

* * * * *